(12) United States Patent
Rajahalme

(10) Patent No.: US 9,385,954 B2
(45) Date of Patent: Jul. 5, 2016

(54) HASHING TECHNIQUES FOR USE IN A NETWORK ENVIRONMENT

(71) Applicant: Nicira, Inc., Palo Alto, CA (US)

(72) Inventor: Jarno Rajahalme, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 266 days.

(21) Appl. No.: 14/231,614

(22) Filed: Mar. 31, 2014

(65) Prior Publication Data

US 2015/0281081 A1  Oct. 1, 2015

(51) Int. Cl.
G06F 15/173 (2006.01)
H04L 12/743 (2013.01)
H04L 29/06 (2006.01)
H04L 29/08 (2006.01)
H04L 9/06 (2006.01)
H04L 9/32 (2006.01)

(52) U.S. Cl.
CPC ............ *H04L 45/7453* (2013.01); *H04L 69/22* (2013.01); *H04L 69/324* (2013.01); *H04L 9/06* (2013.01); *H04L 9/0643* (2013.01); *H04L 9/3236* (2013.01)

(58) Field of Classification Search
CPC ... H04L 45/7453; H04L 69/324; H04L 69/22; H04L 9/06; H04L 9/0643; H04L 9/3236
See application file for complete search history.

(56) References Cited

U.S. PATENT DOCUMENTS

| 5,504,921 | A | 4/1996 | Dev et al. |
| 5,550,816 | A | 8/1996 | Hardwick et al. |
| 5,729,685 | A | 3/1998 | Chatwani et al. |
| 5,751,967 | A | 5/1998 | Raab et al. |
| 6,104,699 | A | 8/2000 | Holender et al. |
| 6,141,738 | A | 10/2000 | Munter et al. |
| 6,219,699 | B1 | 4/2001 | McCloghrie et al. |
| 6,456,624 | B1 | 9/2002 | Eccles et al. |
| 6,512,745 | B1 | 1/2003 | Abe et al. |

(Continued)

FOREIGN PATENT DOCUMENTS

| EP | 1154601 | 11/2001 |
| JP | 2003-069609 | 3/2003 |

(Continued)

OTHER PUBLICATIONS

U.S. Appl. No. 14/231,619, filed Mar. 31, 2014, Rajahalme, Jarno.

(Continued)

*Primary Examiner* — Krisna Lim
(74) *Attorney, Agent, or Firm* — Adeli LLP

(57) ABSTRACT

Some embodiments provide a physical forwarding element that hashes portions of packet headers using several novel hashing techniques. The techniques include a novel set of finishing operations that improve the quality of resulting hashes by increasing their distribution and improving their apparent-randomness. In addition, the finishing operations virtually guarantee that different length inputs will hash to different results, even when padded to be the same initial values. The techniques also include efficient handling of remainder sections when distributing sections of a hash input across multiple processing units. The remainders are hashed into various previously generated hashes based on how many remainders result. These hashing techniques are useful for many network applications.

20 Claims, 15 Drawing Sheets

(56) References Cited

U.S. PATENT DOCUMENTS

| | | |
|---|---|---|
| 6,539,432 B1 | 3/2003 | Taguchi et al. |
| 6,658,002 B1 | 12/2003 | Ross et al. |
| 6,680,934 B1 | 1/2004 | Cain |
| 6,785,843 B1 | 8/2004 | McRae et al. |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,283,473 B2 | 10/2007 | Arndt et al. |
| 7,342,916 B2 | 3/2008 | Das et al. |
| 7,391,771 B2 | 6/2008 | Orava et al. |
| 7,450,598 B2 | 11/2008 | Chen et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,606,260 B2 | 10/2009 | Oguchi et al. |
| 7,633,955 B1 | 12/2009 | Saraiya et al. |
| 7,643,488 B2 | 1/2010 | Khanna et al. |
| 7,649,851 B2 | 1/2010 | Takashige et al. |
| 7,710,874 B2 | 5/2010 | Balakrishnan et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,265,075 B2 | 9/2012 | Pandey |
| 8,281,067 B2 | 10/2012 | Stolowitz |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,351,418 B2 | 1/2013 | Zhao et al. |
| 8,456,984 B2 | 6/2013 | Ranganathan et al. |
| 8,504,718 B2 | 8/2013 | Wang et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,762,501 B2 | 6/2014 | Kempf et al. |
| 8,838,743 B2 | 9/2014 | Lewites et al. |
| 2001/0043614 A1 | 11/2001 | Viswanadham et al. |
| 2002/0093952 A1 | 7/2002 | Gonda |
| 2002/0194369 A1 | 12/2002 | Rawlins et al. |
| 2003/0041170 A1 | 2/2003 | Suzuki |
| 2003/0058850 A1 | 3/2003 | Rangarajan et al. |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0111445 A1 | 5/2005 | Wybenga et al. |
| 2005/0120160 A1 | 6/2005 | Plouffe et al. |
| 2005/0182853 A1 | 8/2005 | Lewites et al. |
| 2005/0220096 A1 | 10/2005 | Friskney et al. |
| 2006/0002370 A1 | 1/2006 | Rabie et al. |
| 2006/0026225 A1 | 2/2006 | Canali et al. |
| 2006/0029056 A1 | 2/2006 | Perera et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0221961 A1 | 10/2006 | Basso et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | de Heer |
| 2008/0240095 A1 | 10/2008 | Basturk |
| 2009/0150527 A1 | 6/2009 | Tripathi et al. |
| 2009/0292858 A1 | 11/2009 | Lambeth et al. |
| 2010/0131636 A1 | 5/2010 | Suri et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2011/0022695 A1 | 1/2011 | Dalal et al. |
| 2011/0075664 A1 | 3/2011 | Lambeth et al. |
| 2011/0085557 A1 | 4/2011 | Gnanasekaram et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0194567 A1 | 8/2011 | Shen |
| 2011/0202755 A1* | 8/2011 | Orsini .................. H04L 63/029 713/151 |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2012/0079478 A1 | 3/2012 | Galles et al. |
| 2012/0182992 A1 | 7/2012 | Cowart et al. |
| 2013/0024579 A1 | 1/2013 | Zhang et al. |
| 2013/0054761 A1 | 2/2013 | Kempf et al. |
| 2013/0058346 A1 | 3/2013 | Sridharan et al. |
| 2013/0163427 A1 | 6/2013 | Beliveau et al. |
| 2013/0163475 A1 | 6/2013 | Beliveau et al. |
| 2013/0339544 A1 | 12/2013 | Mithyantha |
| 2014/0019639 A1 | 1/2014 | Ueno |

(56) References Cited

U.S. PATENT DOCUMENTS

| | | | |
|---|---|---|---|
| 2014/0115578 A1 | 4/2014 | Cooper et al. | |
| 2015/0237016 A1* | 8/2015 | Sao | H04L 63/0428 713/160 |
| 2015/0281081 A1* | 10/2015 | Rajahalme | H04L 45/7453 370/392 |

FOREIGN PATENT DOCUMENTS

| | | |
|---|---|---|
| JP | 2003-124976 | 4/2003 |
| JP | 2003-318949 | 11/2003 |
| WO | WO 2012/126488 | 9/2012 |

OTHER PUBLICATIONS

Anwer, Muhammad Bilal, et al., "Building a Fast, Virtualized Data Plane with Programmable Hardware," Aug. 17, 2009, pp. 1-8, VISA'09, ACM Barcelona, Spain.

Author Unknown, "Open vSwitch, An Open Virtual Switch," Dec. 30, 2010, 2 pages.

Author Unknown, "OpenFlow Switch Specification, Version 0.9.0 (Wire Protocol 0x98)," Jul. 20, 2009, pp. 1-36, Open Networking Foundation.

Author Unknown, "OpenFlow Switch Specification, Version 1.0.0 (Wire Protocol 0x01)," Dec. 31, 2009, pp. 1-42, Open Networking Foundation.

Author Unknown, "OpenFlow Switch Specification, Version 1.1.0 Implemented (Wire Protoco 0x02)," Feb. 28, 2011, pp. 1-56, Open Networking Foundation.

Casado, Martin, et al. "Ethane: Taking Control of the Enterprise," SIGCOMM'07, Aug. 27-31, 2007, pp. 1-12, ACM, Kyoto, Japan.

Curtis, Andrew R., et al., "DevoFlow: Scaling Flow Management for High-Performance Networks," Aug. 15, 2011, pp. 254-265, SIGCOMM, ACM.

Das, Saurav, et al. "Simple Unified Control for Packet and Circuit Networks," Month Unknown, 2009, pp. 147-148, IEEE.

Das, Saurav, et al., "Unifying Packet and Circuit Switched Networks with OpenFlow," Dec. 7, 2009, 10 pages.

Fernandes, Natalia C., et al., "Virtual networks:isolation, performance, and trends," Oct. 7, 2010, 17 pages, Institut Telecom and Springer-Verlag.

Foster, Nate, et al., "Frenetic: A Network Programming Language," ICFP '11, Sep. 19-21, 2011, 13 pages, Tokyo, Japan.

Greenhalgh, Adam, et al., "Flow Processing and the Rise of Commodity Network Hardware," ACM SIGCOMM Computer Communication Review, Apr. 2009, pp. 21-26, vol. 39, No. 2.

Gude, Natasha, et al., "NOX: Towards an Operating System for Networks," Jul. 2008, pp. 105-110, vol. 38, No. 3, ACM SIGCOMM Computer communication Review.

Hinrichs, Timothy L., et al., "Practical Declarative Network Management," WREN'09, Aug. 21, 2009, pp. 1-10, Barcelona, Spain.

Koponen, Teemu, et al., "Network Virtualization in Multi-tenant Datacenters," Aug. 2013, pp. 1-22, VMware, Inc., Palo Alto, California, USA.

Koponen, Teemu, et al., "Onix: A Distributed Control Platform for Large-scale Production Networks," In Proc. OSDI, Oct. 2010, pp. 1-14.

Loo, Boon Thau, et al., "Declarative Routing: Extensible Routing with Declarative Queries," In Proc. of SIGCOMM, Aug. 21-26, 2005, 12 pages, Philadelphia, PA, USA.

Loo Boon Thau, et al., "Implementing Declarative Overlays," In Proc. of SOSP, Oct. 2005, 16 pages. Brighton, United Kingdom.

Matsumoto, Nobutaka, et al., "LightFlow: Speeding Up GPU-based Flow Switching and Facilitating Maintenance of Flow Table," 2012 IEEE 13$^{th}$ International Conference on High Performance Switching and Routing. Jun. 24, 2012, pp. 76-81, IEEE.

McKeown, Nick, et al., "OpenFlow: Enabling Innovation in Campus Networks," ACS SIGCOMM Computer communication Review, Apr. 2008, pp. 69-74, vol. 38, No. 2.

Nygren, Anders, et al., OpenFlow Switch Specification, Version 1.3.4 (Protocol version 0x04), Mar. 27, 2014, pp. 1-84, Open Networking Foundation. (Part 1 of 2).

Nygren, Anders, et al., OpenFlow Switch Specification, Version 1.3.4 (Protocol version 0x04), Mar. 27, 2014, pp. 85-171, Open Networking Foundation. (Part 2 of 2).

Pettit, Justin, et al., "Virtual Switching in an Era of Advanced Edges," Sep. 2010, 7 pages.

Pfaff, B., et al., "The Open vSwitch Database Management Protocol," draft-pfaff-ovsdb-proto-00. Aug. 20, 2012, pp. 1-34, Nicira, Inc., Palo Alto, California, USA.

Pfaff, Ben, et al., "OpenFlow Switch Specification," Sep. 6, 2012, 128 pages, The Open Networking Foundation.

Pfaff, Ben., et al., "Extending Networking into the Virtualzation Layer" Proc. of HotNets, Oct. 2009, pp. 1-6.

Popa, Lucian, et al., "Building Extensible Networks with Rule-Based Forwarding," In USENIX OSDI, Month Unknown, 2010, pp. 1-14.

Sherwood, Rob, et al., "Carving Research Slices Out of Your Production Networks with OpenFlow," ACM SIGCOMM Computer Communications Review, Jan. 2010, pp. 129-130, vol. 40, No. 1.

Sherwood, Rob, et al., "FlowVisor: A Network Virtualization Layer," Oct. 14, 2009, pp. 1-14, OPENFLOW-TR-2009-1.

Tavakoli, Arsalan, et al., "Applying NOX to the Datacenter," month unknown, 2009, 6 pages, Proceedings of HotNets.

Yu, Minlan, et al., "Scalable Flow-Based Networking with DIFANE," Aug. 2010, pp. 1-16, In Proceedings of SIGCOMM.

* cited by examiner

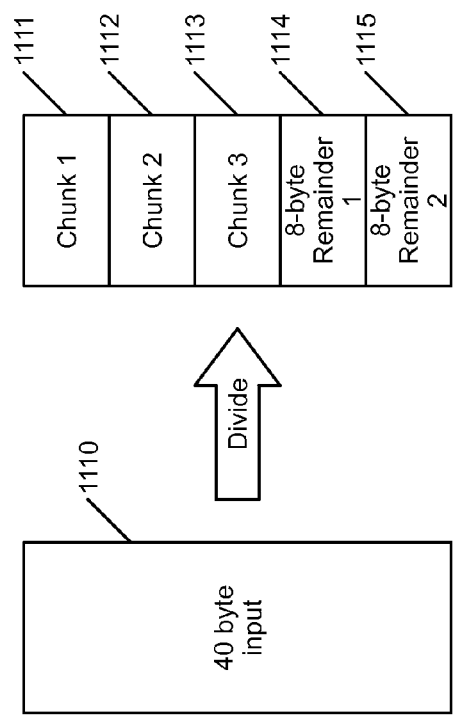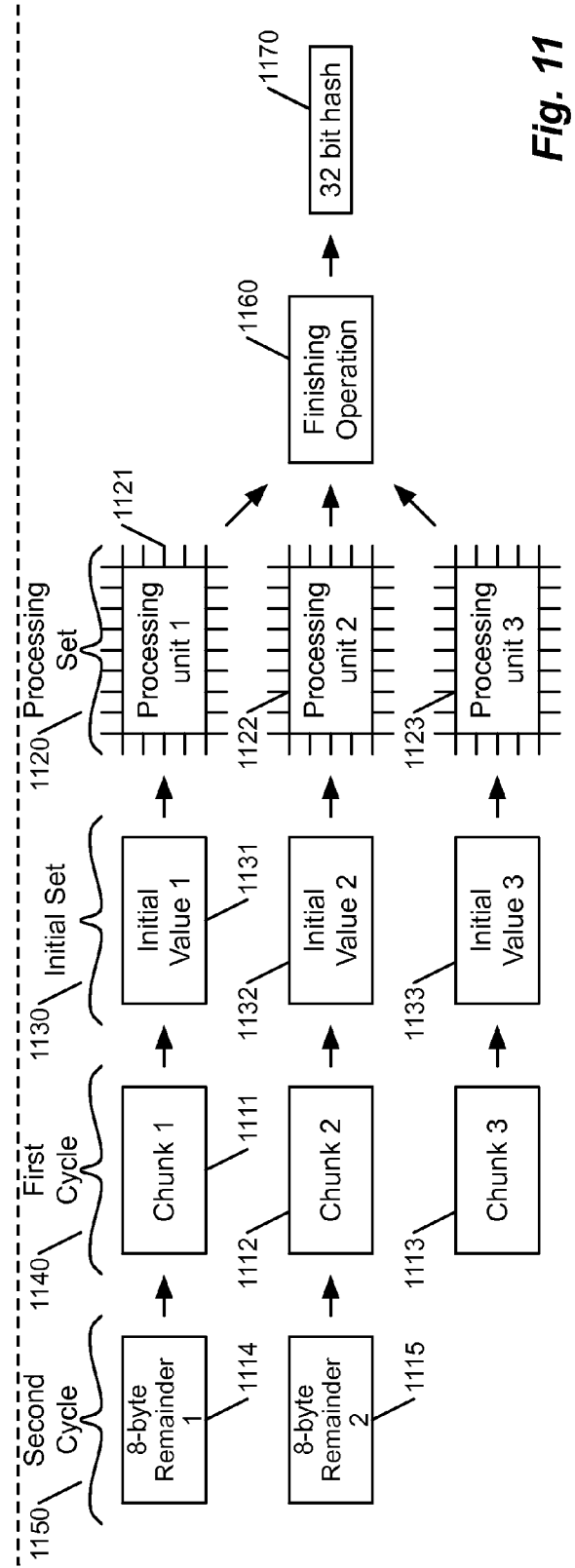
Fig. 11

HASHING TECHNIQUES FOR USE IN A NETWORK ENVIRONMENT

BACKGROUND

Hash functions are used to compute a digest (or fingerprint) of data (or key) with the aim of allocating each data/key instance to a deterministic hash bucket. To be effective, the hash function should produce near uniform distribution of the keys to buckets, so that no bucket should be overloaded while some buckets remain empty. There are many known hash functions with different properties. For data lookup purpose, the hash function need not be cryptographically strong, but the hash distribution and computation speed are important.

Certain central processing units (hereinafter "CPUs") implement instructions that have been reported to provide fast calculation of certain hash functions. The CRC32 instruction in the Intel SSE 4.2 instruction set is one notable example. One of these functions is the CRC32, and it is recommended as a good hash function.

Hashes are regularly performed in a network networking environment. It would be advantageous to use the CRC32 instruction as a hash function in such environment. However, a problem with the CRC32 function is that it fails to produce high quality hashes from short hash inputs, which are likely in many lookup scenarios. These include, for example, short (4-byte, 8-byte, and/or 12-byte) inputs with only one bit set (to 1), all others set (to 0).

Another test case computes hash for distributing a packet across multiple output ports, measuring the distribution of test packets to ports. Here the quality criteria is as uniform as possible distribution to the output ports, so as to avoid burdening one port with excess traffic, while other ports may be sent too little traffic. This hash is also calculated over short input. The plain CRC32 hash function also fails this test.

BRIEF SUMMARY

Embodiments described herein provide a physical forwarding element that processes packets by performing a hashing technique that quickly produces highly entropic hashes. When the physical forwarding element receives a packet, it selects a portion of the packet's header to hash. The physical forwarding element then divides the portion of the header into chunks or sections, and hashes these chunks using several processing units (e.g., hashes the chunks in parallel). The physical forwarding element then combines the individual hashes to produce a resulting hash, and processes the packet using the resulting hash.

The physical forwarding element of some embodiments performs the division or chunking to maximize the use of available processing resources. In some embodiments, the size of a chunk corresponds to the size of input of a processing unit (e.g., a 64-bit chunk for 64-bit arithmetic logic units (hereinafter "ALUs")). The combined size of a set of chunks may be of a specified length, which is directly related to the number of chunks that the physical forwarding element can process in one or more processing cycles. As an example, the physical forwarding might process, in a single processing cycle, three 64-bit chunks using three available 64-bit ALUs.

After hashing several sets of chunks, the physical forwarding may be left with a set of one or more remainder chunks. In some embodiments, the physical forwarding element treats the set of remainder chunks differently than other non-remainder chunks. For instance, when the size of the set of remainder chunks is less than the specified length, the physical forwarding element of some embodiments does not pad the remainder set to make the remainder set equal to the specified length (e.g., not padding a remainder set with only a single 64-bit remainder to include enough bits to fill 3 64-bit ALUs). Instead of padding, the physical forwarding element hashes one or more remainder chunks into one or more of the previously generated hashes. In this manner, the physical forwarding element saves processing resources by allowing the processing units that would be hashing the padding to instead be available for other processes.

Alternatively, or conjunctively with hashing chunks, the physical forwarding element of some embodiments performs a finishing technique that improves the quality of the resultant hash. The finishing technique can include one or more of the following operations: accumulating the length of the portion into the hash, multiplying the hash by a suitably large prime number, and performing a logical exclusive disjunction operation on the hash. In some embodiments, the physical forwarding element accumulates the length of the portion into the hash to ensure that inputs of different lengths hash to different resultant hashes. When short inputs must be padded to reach an even number of bytes, some applications require that the padded input (e.g. 7 bytes of input padded with zero bits to be 8 bytes) and an unpadded input of the same length with the same values (e.g. 8 bytes) result in different hashes.

In some embodiments, the physical forwarding element multiplies the hash by a particular prime number (e.g., 1990399639 or some other number) to increase distribution of bits within the hash. The physical forwarding element performs a logical exclusive disjunction operation of higher bits of the hash with lower bits of the hash to improve entropy (i.e. apparent randomness) of the lower bits of the hash. The lower bits of the hash are often used as indices for hash lookup tables; therefore, some applications require the lower bits to be as random as possible. Once one or more of the finishing operations are performed, the physical forwarding uses the resultant hash to process the packet.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 11 conceptually illustrates an example of striping hash input chunks across multiple processing units where there are two remainder chunks.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a physical forwarding element that processes packets by performing a hashing technique that quickly produces highly entropic hashes. When the physical forwarding element receives a packet, it selects a portion of the packet's header to hash. The physical forwarding element then divides the portion of the header into chunks or sections, and hashes these chunks using several processing units (e.g., hashes the chunks in parallel). The physical forwarding element then combines the individual hashes to produce a resulting hash, and processes the packet using the resulting hash.

The physical forwarding element of some embodiments performs the division or chunking to maximize the use of available processing resources. In some embodiments, the size of a chunk corresponds to the size of input of a processing unit (e.g., a 64-bit chunk for 64-bit arithmetic logic units (ALUs)). The combined size of a set of chunks may be of a specified length, which is directly related to the number of chunks that the physical forwarding element can process in one or more processing cycles. As an example, the physical forwarding might process, in a single processing cycle, three 64-bit chunks using three available 64-bit ALUs.

After hashing several sets of chunks, the physical forwarding may be left with a set of one or more remainder chunks. In some embodiments, the physical forwarding element treats the set of remainder chunks differently than other non-remainder chunks. For instance, when the size of the set of remainder chunks is less than the specified length, the physical forwarding element of some embodiments does not pad the remainder set to make the remainder set equal to the specified length (e.g., not padding a remainder set with only a single 64-bit remainder to include enough bits to fill 3 64-bit ALUs). Instead of padding, the physical forwarding element hashes one or more remainder chunks into one or more of the previously generated hashes.

Figure 1:
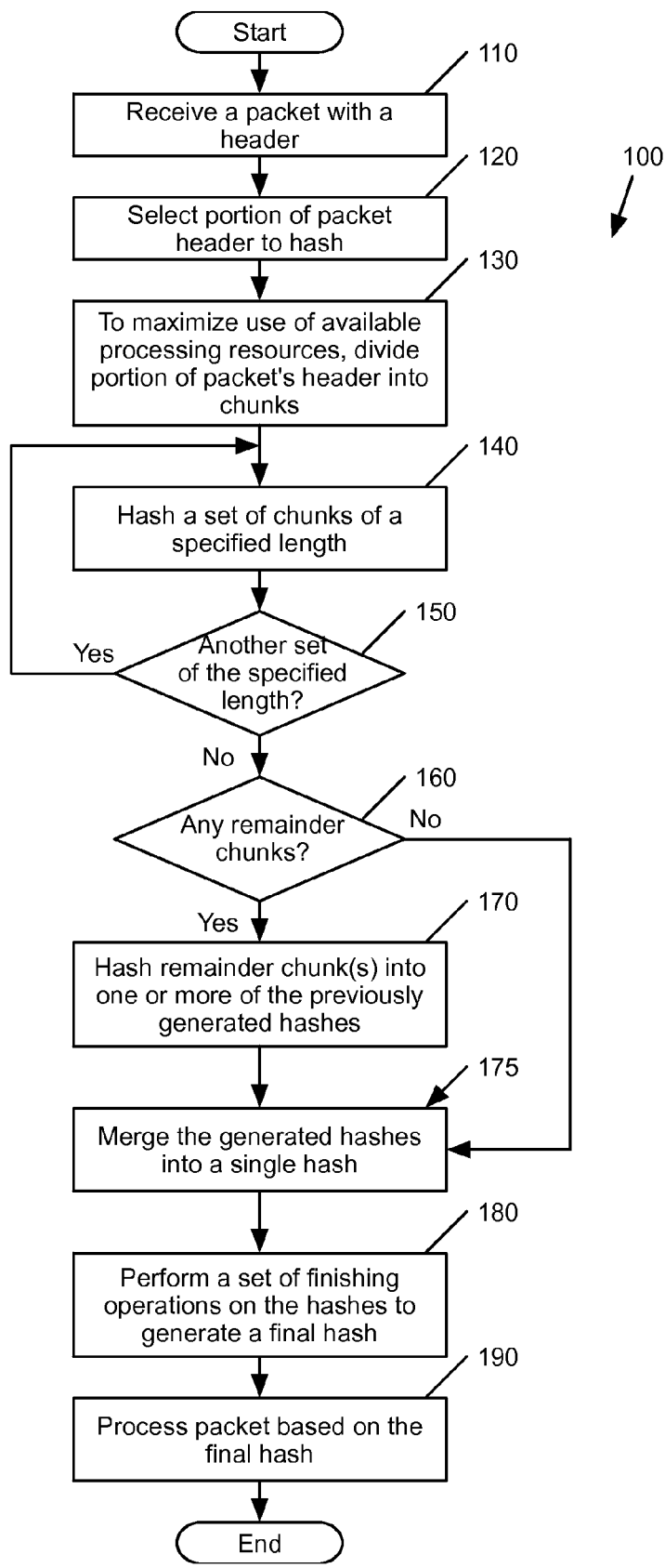
FIG. 1 conceptually illustrates a process that some embodiments use to process packets based on hashes produced from packet headers.

FIG. 1 conceptually illustrates a process 100 that some embodiments implement to generate a hash based on different chunks. In some embodiments, the process 100 is performed by the physical forwarding element. The process 100 begins by receiving (at 110) a packet with a header. The term "packet" is used here as well as throughout this application to refer to a collection of bits in a particular format sent across a network. One of ordinary skill in the art will recognize that the term "packet" may be used herein to refer to various formatted collections of bits or unit of data that may be sent across a network, such as Ethernet frames, TCP segments, UDP datagrams, IP packets, etc. Typically, such unit of data includes user data (also referred to as payload) and control data (e.g., in the header) used to deliver the data. While embodiments of the invention are described in relation to packets, the methods described herein can be applied to other data besides packets (e.g., video files, audio files, computer messages, binary data, computer code, etc.).

At 120, the process 100 selects a portion of the packet's header to hash. In order maximize the use of available processing resources; the process 100 divides (at 130) the portion into chunks. In some embodiments, the size of each chunk corresponds to an input size for the processing units available to the physical forwarding element. For instance, if the physical forwarding element has 64-bit ALUs as its processing units, then the portion will be divided into equally sized 64-bit chunks. In some embodiments, the portion is divided into as many chunks equal in size to an input size of the processing units as possible. In these embodiments, remainder chunks that are less than the equally sized chunks can remain. For example, a 224-bit portion can be divided into three equally sized 64-bit chunks and a 32-bit remainder chunk.

The process 100 then hashes (140) sets of the chunks of a specified length. In some embodiments, the specified length corresponds to how many chunks the physical forwarding element can process in a single processing cycle (e.g. three 64-bit ALUs can process three 64-bit chunks in a single processing cycle). After hashing all sets of chunks of the specified length, a set of remainder chunks of less than the specified length can remain. For instance, the set of remainder chunks may include a single remainder chunk or multiple remainder chunks having a combined size that is less than the specified length. The process then determines (at 150) whether to hash another set of chunks of the specified length. If so, the process returns to operation 150. Otherwise, the process proceeds to 160, which is described below.

The process then determines (at 160) whether a set of remainder chunks is left over. When a set of remainder chunks is left over, the process 100 hashes (at 170) the remainder chunks into one or more of the previously generated hashes. In some embodiments, the remainder chunks are hashed into the previously generated hashes using a hash function that takes two pieces of data as inputs. These two pieces of data include first, the data to be hashed, and second, a basis value. When hashing the remainder chunks into the previously generated hashes, some embodiments use a remainder chunk as the data to be hashed and a previously generated hash as the basis value.

After all (if any) remainder chunks have been hashed, the process 100 then merges (at 175) the generated hashes into a single hash. In some embodiments, the process 100 merges the generated hashes by applying a series of addition and binary operations to the hashes. The process 100 then performs (at 180) a set of finishing operations on the generated hashes to generate a final hash. In some embodiments, the finishing operations are applied to improve the quality of the final hash. The process 100 then processes (at 190) the packet based on the final hash. The process 100 then ends.

Some embodiments perform variations on the process 100. The specific operations of the process 100 may not be performed in the exact order shown and described. The specific operations may not be performed in one continuous series of operations, and different specific operations may be performed in different embodiments.

As mentioned above, the process may be performed by a physical forwarding element. The physical forwarding element of some embodiments operates in conjunction with one or more other physical forwarding elements to collectively implement different logical forwarding elements (e.g., logical switches, logical routers, etc.) for different logical networks of different tenants, users, departments, etc. that use the same shared computing and networking resources. Accordingly, the term physical forwarding element is used herein to differentiate it from a logical forwarding element.

In addition, although many of the examples described herein shows a physical forwarding element, the hashing can be performed by any component or appliance that requires quality hashes for different purposes. As an example, the hashing can be performed by a network load balancer appliance that balances traffic for different server clusters. Alternatively, the hashing may be used for data partitioning in distributed storage services. The hashing may be used for firewalling, per-flow statistics in switches (e.g., quality of service (QoS)), etc., peer-to-peer (P2P) file sharing, etc.

In some embodiments, the physical forwarding element is a software forwarding element that operates on a computing device or host device. Such a computing device includes a set of processing units. Accordingly, the above-described available processing resources of the physical forwarding element correspond to said set of processing units, in some embodiments. The set of processing units of the physical forwarding element can be any of piece of hardware capable of executing hashing instructions, such as: ALUs, CPUs, CPU cores, Network Processing Units (hereinafter "NPUs"), ASICs, etc. The above-mentioned processing cycle corresponds to a cycle of processing performed by the processing units (e.g. 1 cycle of computations by three ALUs).

In some embodiments, the above described hash operations are performed using hardware instructions that quickly execute on certain types of processing units. As an example, a CRC32 instruction from the Intel SSE 4.2 instruction set can be used to quickly produce a 32-bit checksum from an input message on Intel chipsets. This 32-bit checksum can then be used as a hash of the input message. The Intel SSE 4.2 instruction set provides several CRC32 instructions that can accept many sizes of inputs, such as 8-bits, 16-bits, 32-bits, and 64-bits. In some embodiments, the size of the input sized corresponds to the size of chunks produced by process 100. For instance, when the 64-bit CRC32 instruction for a 64-bit processing unit is used to hash an input message, the process 100 of some embodiments may divide (at 130) the input message into 64-bit chunks. In this way, the physical forwarding element efficiently maximizes its available processing resources. One of ordinary skill in the art would understand the different input sizes could change with different hardware components and/or hardware instructions.

Many more examples of hash operations are described below. Specifically, Section I describes several examples of performing one or more different finishing operations to improve the quality of hashes. Section II describes a detailed process and associated examples for striping hash input chunks across multiple processing units and efficiently handling any remainder chunks. Section III then describes several example uses of such hashes in a network environment. Lastly, Section IV describes an electronic system for implementing some embodiments of the invention.

I. Finishing Operations that Improve Hash Quality

As mentioned above, the physical forwarding of some embodiments performs a finishing technique that improves the quality of the resultant hash. High quality hashes exhibit uniform distribution amongst the possible range of hash results. Distribution is essential in applications where hashes must evenly spread to several bucket values, such as when load balancing packets across several ports. In addition, high quality hashes exhibit high entropy (i.e. apparent randomness or pseudo-randomness) amongst the bits of the hash themselves. Entropy is important where the hashes must serve as near random values, such as when used as indices for a hash table. The finishing operations act to increase the distribution and entropy of a final hash value.

Figure 2:
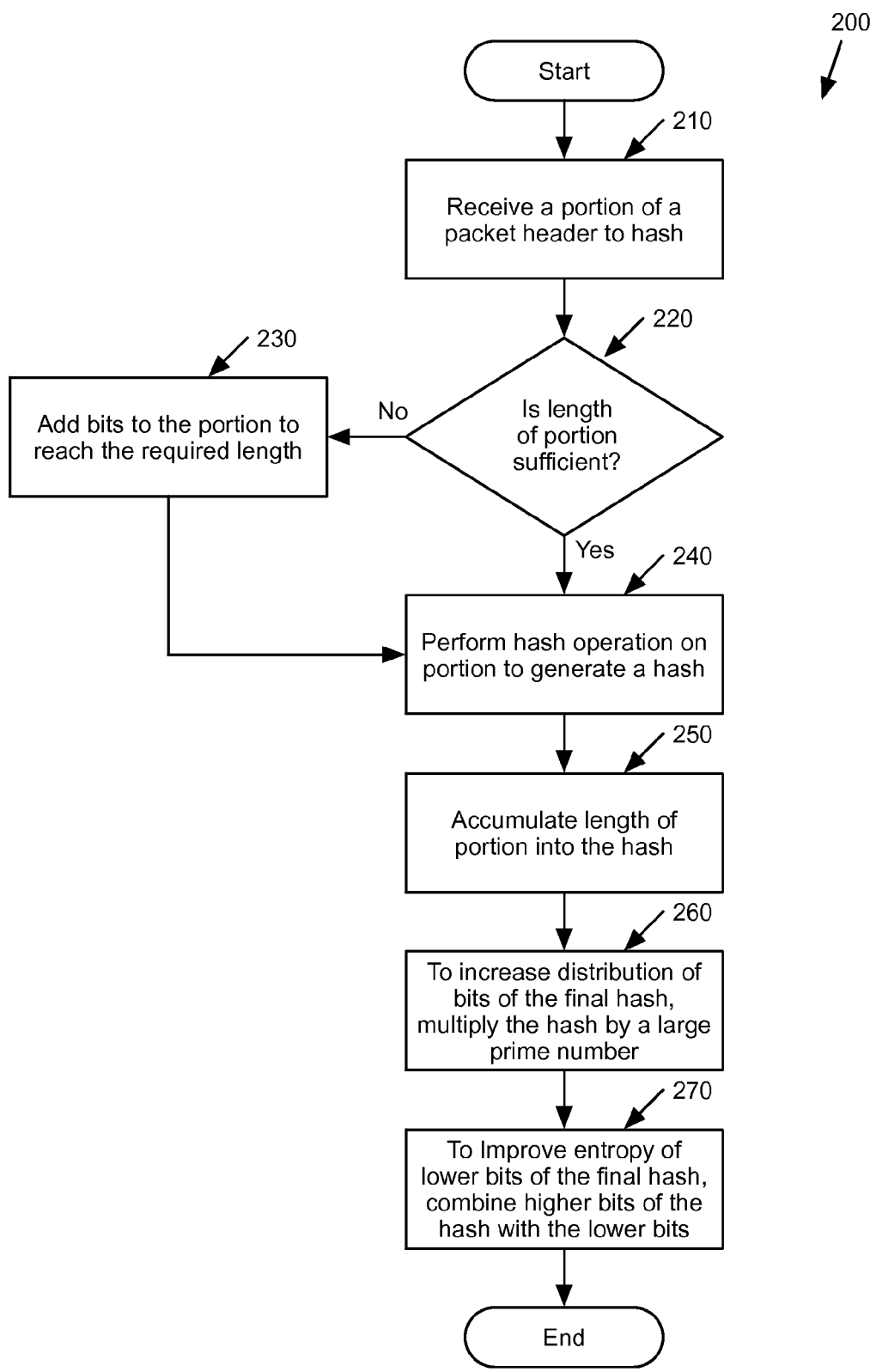
FIG. 2 conceptually illustrates a process that some embodiments use to improve the quality of hashes.

FIG. 2 conceptually illustrates a process 200 that some embodiments implement to improve the quality of hashes using a set of finishing operations. The set of finishing operations increase the distribution and entropy of a hash, thereby improving the hash's utility in a number of applications. In some embodiments, process 200 is performed by a physical forwarding element. FIG. 2 will discussed in connection with the examples shown in FIG. 3 and FIG. 4.

The process 200 begins by receiving (at 210) a portion of a packet header to hash. The process 200 then determines (at 220) whether the length of the portion is sufficient to be hashed. In some embodiments, the sufficient length corresponds to required increments for inputs to the hashing operations. For instance, when the hash operation used is the 64-bit CRC32 function, inputs must be in increments of 8 bytes. When the length of the portion is insufficient, process 200 adds (at 230) bits to the portion to reach the required length. For instance, if the portion is 7 bytes long, but the hash operation used by process 200 requires input to be in 8-byte increments (e.g., 64-bit CRC32), the portion will have to be padded up to an 8-byte increment. In some embodiments, the process 200 will add zeroes to the end of the portion to pad it up to the sufficient input length. Different embodiments of the invention may require different sufficient lengths of input (e.g., 4 bytes, 12 bytes, or 16 bytes).

The process 200 then performs (at 240) a hash operation on a portion of the packet header. In some embodiments, the hash operation is a hardware hash instruction such as CRC32. The portion of the packet header can include several tuples from several fields of the packet. The tuples can range from several bits to several hundreds of bytes, depending on the size of the portion selected. Example tuples include fields for source MAC address, TCP/IP port, or destination IP address.

The process 200 then accumulates (at 250) the length of the selected portion to the hash. In some embodiments, the length of the selected portion is a number of bytes present in all of the selected tuples from the packet header. In some embodiments, the accumulation operation is an additional call to a CRC32 instruction that takes as input the hash and the length of the portion. The accumulation operation ensures that different length portions hash to different results. In order to illustrate the need for the accumulation operation, an example is provided in FIG. 3.

Figure 3:
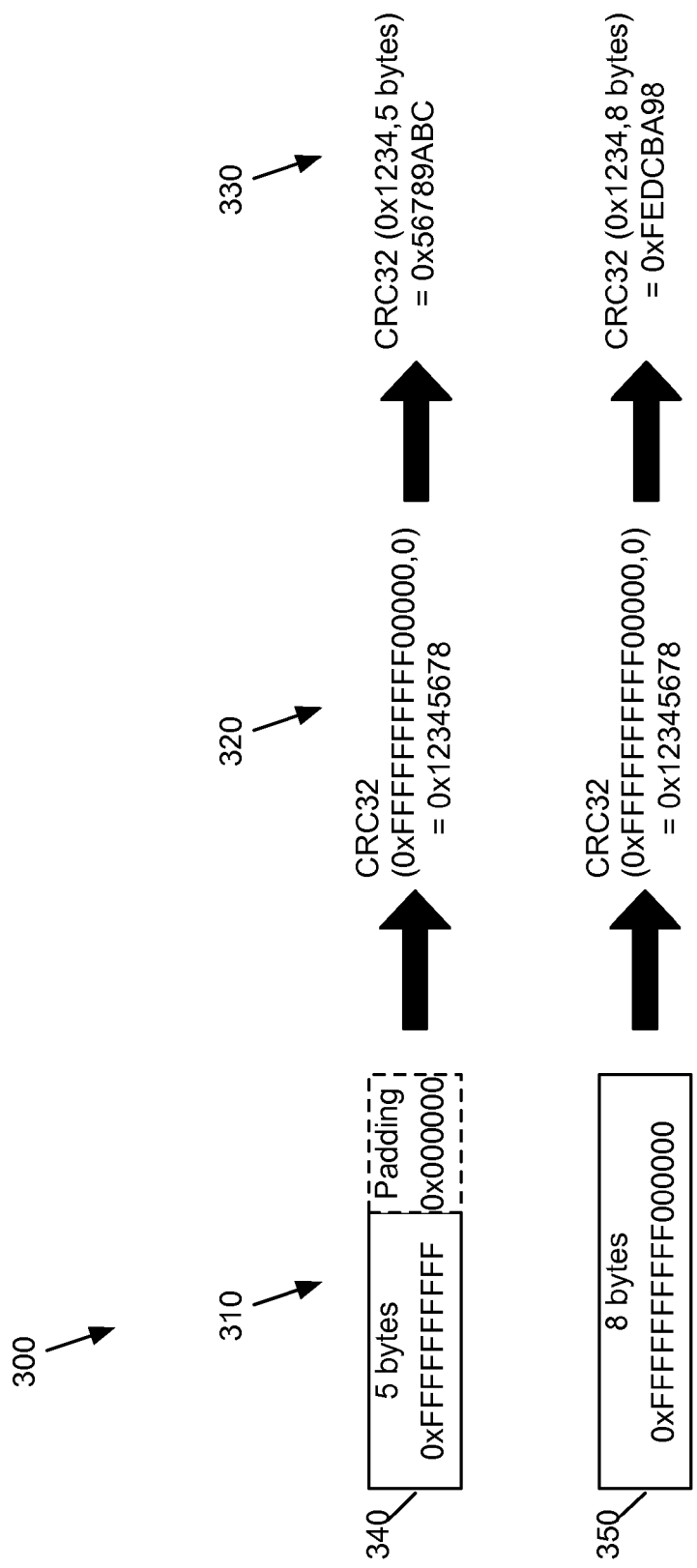
FIG. 3 conceptually illustrates an example of the accumulation of the length into a hash to guarantee different lengths of input hash to different values.

FIG. 3 illustrates an example 300 accumulation of lengths of hash input to two example hashes. Specifically, the figure shows in three operational stages 310-330 of the example 300 as it progresses through padding operations, hashing operations, and accumulation operations applied to 5-byte input 340 and 8-byte input 350. 5-byte input 340 and 8-byte input 350 have their bit values displayed in hexadecimal for ease of presentation. In this example, each hexadecimal value is 4 bits. The specific values provided in the example 300 are for exemplary purposes only and different embodiments have different values.

The first stage 310 shows a padding operation being applied to the 5-byte input 340. In the first stage 310, 5-byte input 340 is being padded up to 8 bytes with three bytes of zero bits (e.g. 0x000000). As 8-byte input 350 is already 8 bytes, it is not padded in the first state 310. After padding, 5-byte input 340 will have a value of 0xFFFFFFFFFF000000. However, 8-byte input 350 also has a value of 0xFFFFFFFFFF000000. Many applications require that these two inputs hash to different values as they are different lengths, but the padding has resulted in them having identical values.

The second stage 320 shows hashing operations being applied to the two inputs. Specifically, the second stage 320 shows padded 5-byte input 340 and 8-byte input 350 being hashed using the CRC32 function. As shown, the CRC32 function accepts two inputs, first, a value to be hashed, and second, a basis value. In this case, a basis of zero is used. Other embodiments may use different basis values. The results of the CRC32 hashes are identical (e.g., 0x12345678) because both inputs to the CRC32 function are identical (0xFFFFFFFFFF000000, 0). This is a problematic result for many networking applications.

The third stage 330 shows accumulation operations being applied to the two inputs. Specifically, the third stage 330 shows the results from the hashing operations being hashed again, but with the lengths of the inputs used as bases. However, in some embodiments the lengths of the inputs can be used as the data to be hashed with the previous hashes used as basis. As shown, the result from hashing padded 5-byte input 340 is hashed with a basis equal to 5 bytes (the length of 5-byte input 340). The result from hashing 8-byte input 350 is hashed with a basis equal to 8 bytes (the length of 8-byte input 350). The results of these accumulation operations are different because the basis used in each operation is different. In this manner, accumulating lengths of inputs in CRC32 instructions virtually guarantees that different length inputs will hash to different hashes, even when padded to be identical.

In some embodiments, the input portions are always selected in strict size increments (e.g. always 8 bytes). When strict input sizes are used, the accumulation operation (at 250) is not necessary. This is the case when input sizes are constants known at compilation time. Having discussed guaranteeing different results for different lengths, specific operations for improving the quality of the resulting hash will now be discussed.

To increase distribution of bits of the final hash, the process 200 multiplies (at 260) the hash by a suitable large prime number. For example, the process 200 may multiply the hash by 1990399639 (i.e. 76a31697 in hexadecimal). Other embodiments can use different large prime numbers. The multiplication by a large prime number reduces the probability that sets of hashes will cluster within a range of similar results. This increased distribution also aids in achieving uniformity of resulting hashes. The large prime numbers can be determined experimentally using network diagnostics software.

As shown in FIG. 2, to increase the entropy of the lower bits of the final hash, the process 200 combines (at 270) higher bits of the hash with lower bits of the hash. In some embodiments, the combination is achieved by shifting the higher bits of the hash to the lower bits (e.g. by performing a bitwise rotation), and then combining the shifted higher bits with the lower bits of the hash. In some embodiments, the combination is a logical exclusive disjunction operation (i.e., XOR). The lower bits are the less significant bits, whereas the upper bits are the more significant bits. The entropy of the lower bits of the hash is important in many applications, as the lower bits of a hash are often used as indices for a hash for hash tables. For instance, the physical forwarding element may use the lowest four most bits of the hash value as an index to assign packets to one of 16 possible outbound ports. Accordingly, the lower bits must be as random appearing (or pseudo-random) as possible to ensure an even distribution of packets across outbound ports. In order to illustrate how process 200 increases the entropy of the lower bits of a hash, an example is provided in FIG. 4.

Figure 4:
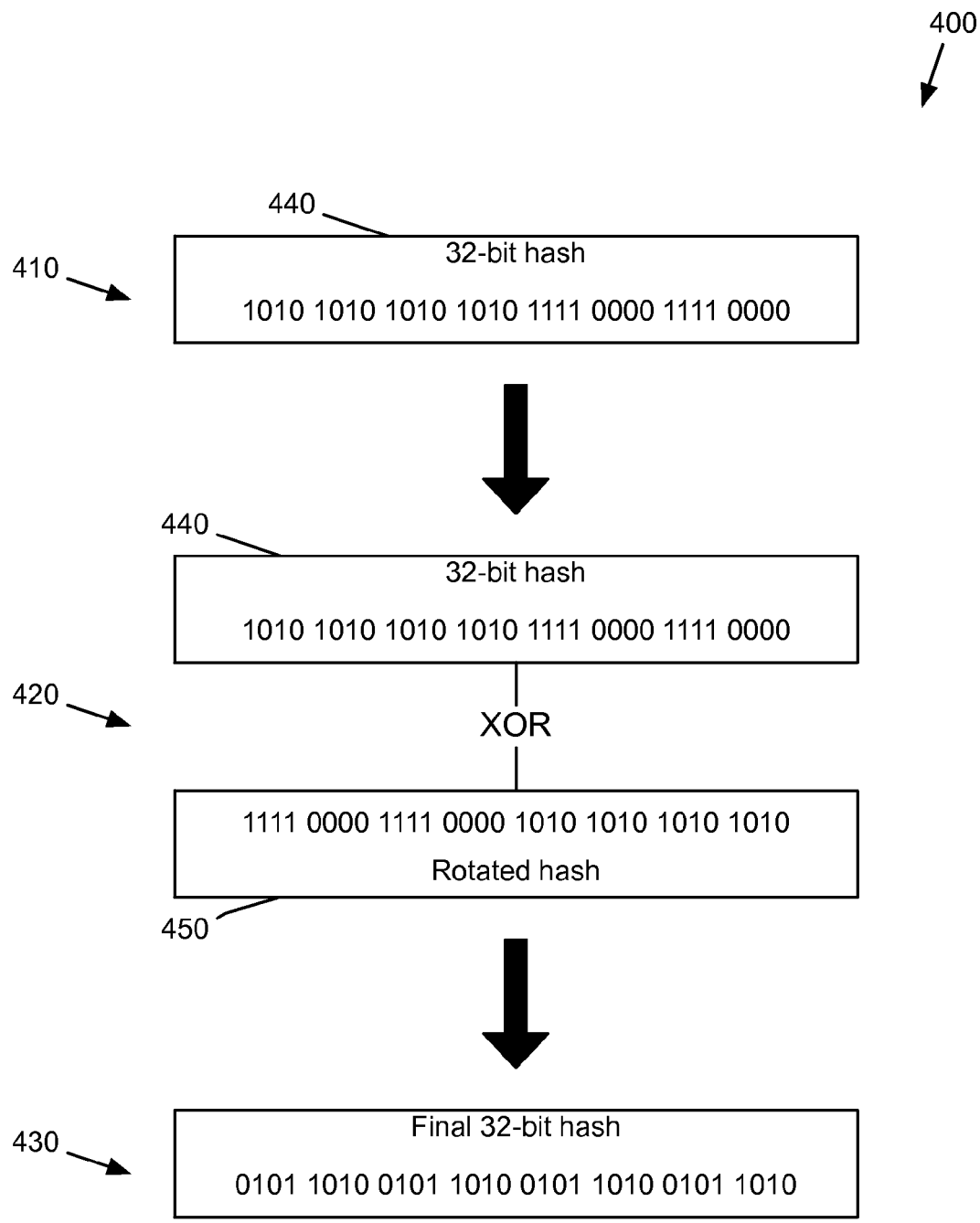
FIG. 4 conceptually illustrates an example operation to increase the entropy of the lower half of bits of a hash.

FIG. 4 illustrates an example 400 combination of the upper bits of a hash with the lower bits of a hash using an XOR operation. Example 400 includes three operational stages 410-430. The specific bit values provided in example 400 are for exemplary purposes only and different embodiments may have different values.

The first stage 410 shows 32-bit hash 440. The lower half of the bits of 32-bit hash 440 (1111 0000 1111 0000) is hardly random appearing. In order to increase the entropy of the lower bits of hash 440, the upper bits (1010 1010 1010 1010) will be combined with the lower bits. The second stage 420 shows hash 440 being XOR'ed with a 16-bit rotation of itself 450. XOR operation returns 1 when two input values are different and 0 when two input values are the same. The third stage 430 shows 32-bit final hash 460 generated from the previous XOR operation. As shown, final hash 460 is substantially more random-appearing in its lower bits (0101 1010 0101 1010) than the lower bits of hash 440 (1111 0000 1111 0000).

An additional advantage of performing the above-described operations as finishing operations is that these operations are moved out of the main hashing operation. Any additional computations during the main hash operation will slow down cycles of hashing when such hash operations are striped across multiple processing units. By moving the finishing operations out of the main loop of hash operations, the finishing operations can be performed without slowing down these main hashing cycles. Having discussed techniques that use finishing operations to improve the quality of hashes, the application of such techniques to inputs of varying lengths will now be discussed.

Figure 5:
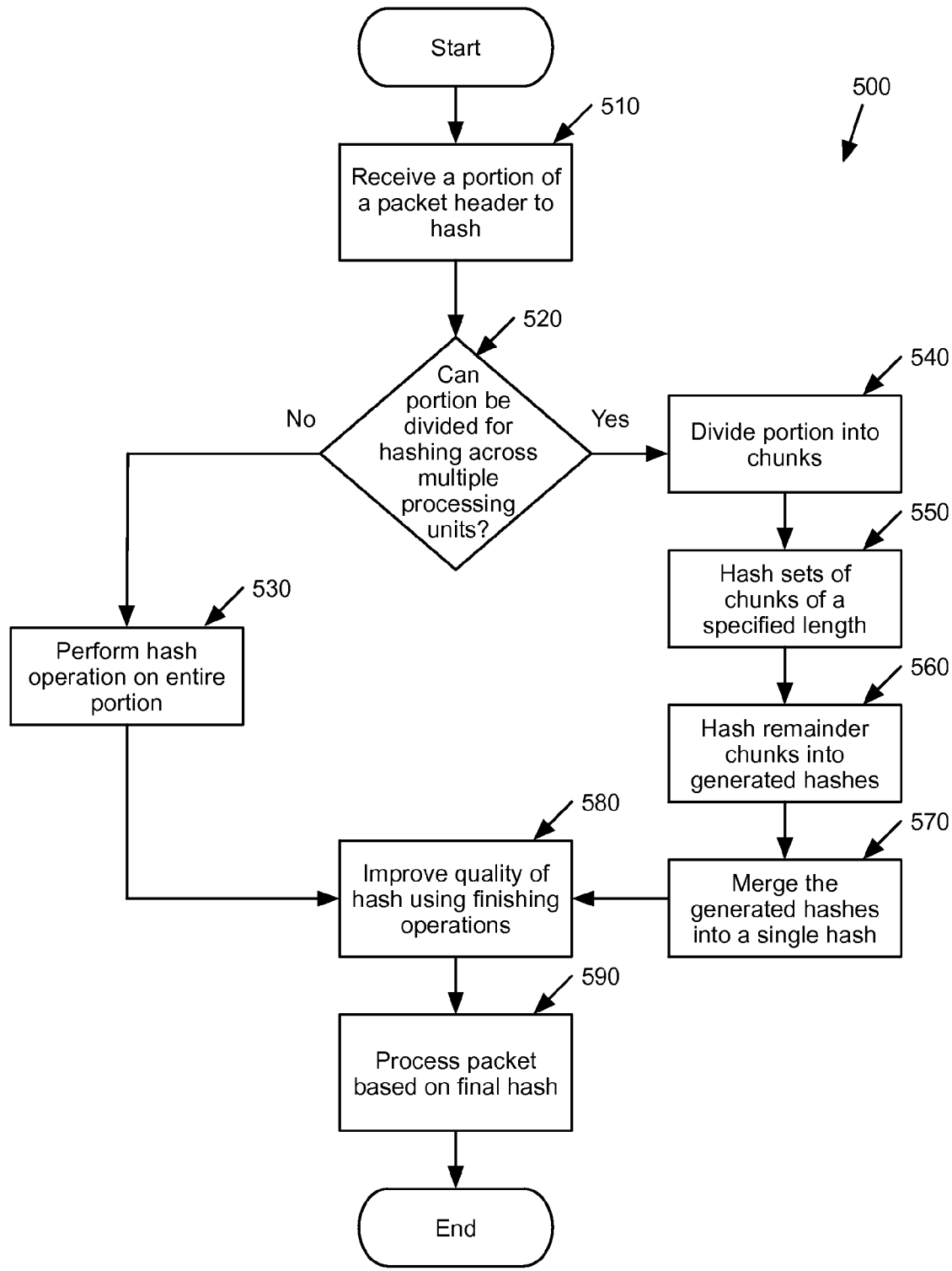
FIG. 5 conceptually illustrates a process that some embodiments use to optimize use of processing resources when dealing with hash inputs of varying lengths.

FIG. 5 conceptually illustrates a process 500 that some embodiments use when hashing different lengths of inputs. In some embodiments, process 500 is performed by a physical forwarding element with a plurality of processing units.

Process 500 begins by receiving (at 510) a portion of a packet header to hash. The process 500 then determines (at 520) whether the portion can be divided for hashing across multiple processing units. In some embodiments, the process 500 makes this determination based on a comparison of the size the portion to a size of the processing units of the physical forwarding element. For instance, when the physical forwarding element has 64-bit processing units, then the process 500 will make the determination (at 520) based on whether the portion is greater than 64-bits. When the portion can be hashed using a single processing unit, process 500 performs (at 530) the hash operation on the entire portion using a single processing unit.

When the portion can be divided amongst several processing units, the process 500 divides (at 540) the portion into chunks. The size of the chunks will correspond to the size of the processing units of the physical forwarding element (e.g., 64-bit chunks for 64-bit ALUs). The process 500 then hashes (at 550) sets of chunks of a specified length. The specified length of the sets of chunks corresponds to a total amount of bits the processing units of the physical forwarding element can process in a single cycle. For instance, when the physical forwarding element has three 64-bit ALUs, the specified length will be 192 bits (e.g., three 64-bit chunks).

After hashing the sets of chunks of the specified length, the process 500 hashes (at 560) any remainder chunks into the previously generated hashes. In different cases, there can be one or more remainder chunks. There may be remainder chunks when the portion of header does not evenly divide across the processing units. For instance, when the portion is divided into four chunks, yet there are only three processing units, then the fourth chunk will be hashed into a previously generated hash. The process 500 then merges (at 570) the generated hashes into a single hash. In some embodiments, the process merges the hashes by applying a series of addition and/or binary operations to the several generated hashes.

After generating a hash using either a single processing unit or multiple processing units, process 500 performs (at 580) finishing operations on the generated hash. In some embodiments, the finishing operations can include the operations described above in connection with process 200 of FIG. 2. For instance, finishing operations performed by process 500 can include any one or more of the following: accumulating a length of the portion into the hash, multiplying the hash by a large prime number, and combining the lower bits of the hash with the upper bits of the hash. In some embodiments, the merger operation (at 570) is implemented as an operation within the set of finishing operations.

Finally, process 500 processes (at 590) the packet based on the final hash. The final hash can be used as in index for lookup operations in flow tables. When the hash matches an index of a flow in a flow table, the matching flow will indicate forwarding actions to take on the packet from which the hash was generated. For instance, a flow may indicate where to forward a packet or whether to drop a packet. A more detailed example of using a hash in flow table lookups will be discussed in section III below.

The process 500 can be further optimized in the case where the size of the portion to hash is known at compile time. Because process 500 will always pick the same hash function for a particular length portion, the compiler can simply omit compilation of instructions for striping the portion across multiple processing units when it is known at compile that that the portion will be smaller than a single processing unit. For instance, if it is known at compile time that the portion will be 6 bytes (48 bits), it is not necessary to compile instructions for striping this portion across several 64-bit processors.

At 590, the process 500 processes the packet. The process 500 then ends. Some embodiments perform variations on the process 500. The specific operations of the process 500 may not be performed in the exact order shown and described. The specific operations may not be performed in one continuous series of operations, and different specific operations may be performed in different embodiments.

II. Detailed Process and Associated Examples for Efficiently Handling Remainder Chunks in Multiple Processing Unit Hashing Having discussed performing hash operations using several processors, a more detailed process for handling remainders in multiple processing unit hashing will now be discussed by reference to FIG. 6-12. As mentioned above, hash inputs can be distributed across multiple processing units. However, doing so can result in remainder chunks that do not evenly divide amongst a set of processing units. For instance, when a hash input is divided into four chunks, yet there are only three processing units, then the fourth chunk will need to be handled somehow. Prior art methods of handling remainders in multiple processing unit hash operations would simply pad remainder chunks until every processing unit had something to hash. This padding would result in extra hashing. In the four chunks and three processing unit case mentioned above, two additional padding chunks would be added. Hashing padding values results in wasted processing cycles.

Figure 6:
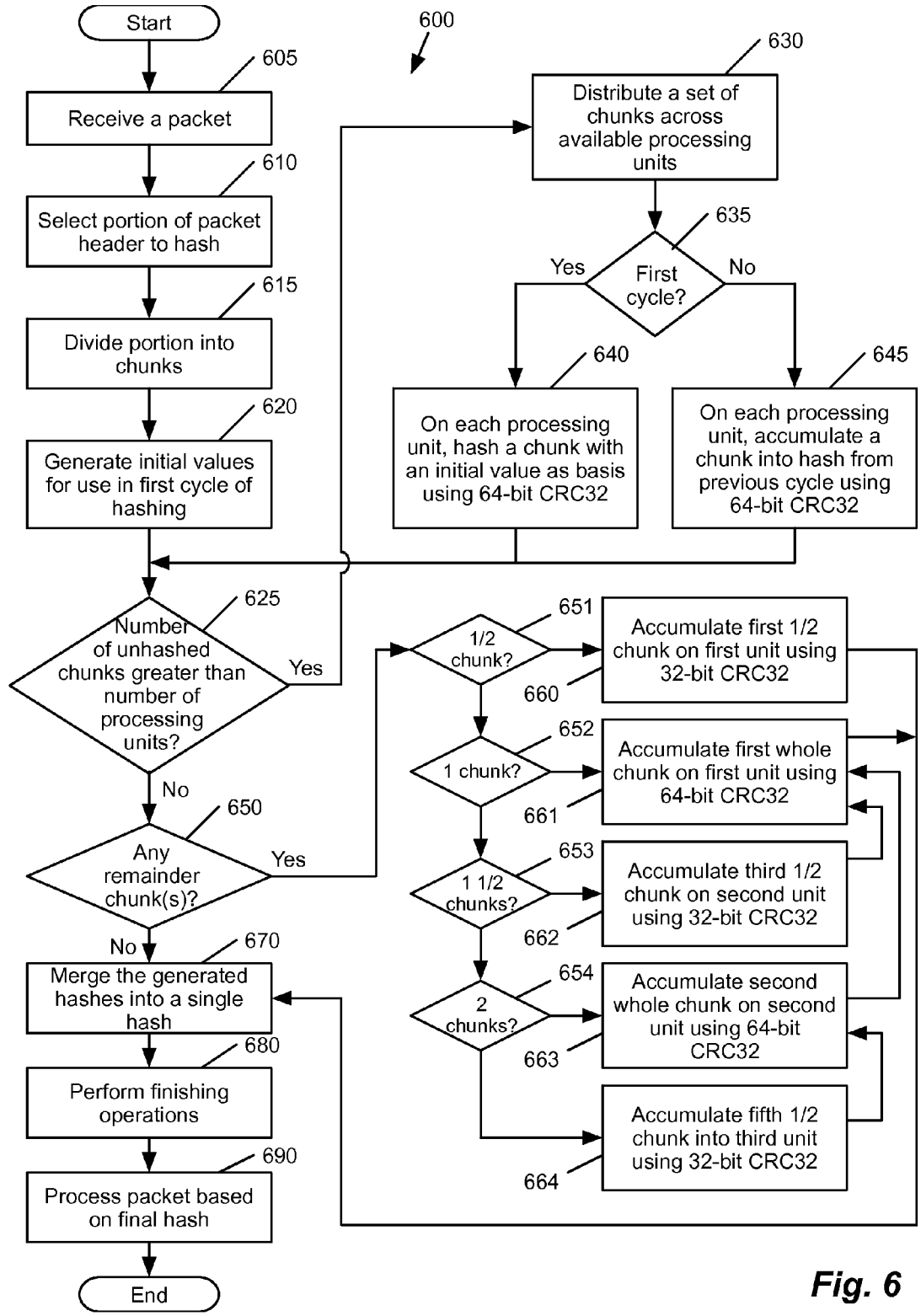
FIG. 6 illustrates a detailed process that some embodiments use to stripe hash input chunks across multiple processing units and efficiently handle any remainder chunks.

Some embodiments provide novel techniques for improving the efficiency of hashing operations that use multiple processing units by eliminating the need for padding up hash inputs to fill all available processing units. FIG. 6 conceptually illustrates a process 600 that some embodiments use to take advantage of these novel techniques when processing packets. In some embodiments, process 600 is performed by a physical forwarding element with a plurality of processing units. Process 600 begins by receiving (at 605) a packet with a header. The process 600 then selects (at 610) a portion of the packet's header to hash. The process 600 then divides (at 615) the selected portion into chunks. The size of the chunks may correspond to the size of the processing units of the physical forwarding element (e.g., 64-bit chunks for 64-bit ALUs). This division into chunks allows for later distribution of these chunks across the set of processing units used by the physical forwarding element. Prior to distribution of these chunks to the set of processing units, the process 600 generates (at 620) initial values for use in a first cycle of hashing on the set of processing units. These initial values will serve as a set of basis values for the hashes.

Different basis values will result in different resulting hashes from the same hash input. In some embodiments, the initial values can be large prime numbers, generated from qualities of the input (e.g. the length of the input), or initially generated at run time (e.g., computing the basis values using a random function). However, for any particular hash function, a same set of basis values must be chosen for each round of hashing operations to ensure that the resulting hashes are generated on the same hash function. For instance, if the basis values are randomly generated, then the same set of randomly generated basis values must be consistently used across several hash operations. In some embodiments, initial chunks of the portion can be used as a set of basis values for the hash functions. For instance, a first set of three chunks could be used as the basis values, and a second set of three chunks could then be used as the data to be hashed.

The process 600 then determines (at 625) if the number of unhashed chunks is greater than the number of processing units in the set of processing units. As a first example, when a 48-byte selected portion is divided into six 8-byte chunks for distribution across three 64-bit (8-byte) processing units, there will be more unhashed chunks than processing units (e.g. six chunks versus three processing units). When the number of unhashed chunks is greater than the number of processing units, as in the first example, the process 600 will proceed to distribute (at 630) a set of chunks across the available processing units. This distribution enables the distributed chunks to be processed in parallel in a single processing cycle. The process 600 will distribute (at 630) a set of chunk equal in number to a number of available processing units. The distributed set of chunks will correspond in length (e.g. total number of bits) to a total number of bits available in the set of processing units. In the first example, three 8-byte (64-bit chunks) will be distributed to the three 64-bit processing units.

The process 600 then determines (at 635) whether this processing cycle is the first processing cycle. When process 600 is on its first cycle, process 600 of some embodiments hashes (at 640) a chunk with an initial value as basis using 64-bit CRC32 on each processing unit. The CRC32 instruction takes two inputs, a data to be hashed and a basis value. The CRC32 generates a checksum based on the two inputs. This checksum can be used as a hash for the data to be hashed.

When the process 600 is on the first cycle, the CRC32 instructions on each processing unit will receive an unhashed chunk as the data to be hashed and an initial value as the basis value. However, when the process 600 is not on its first cycle, process 600 of some embodiments accumulates (at 645) an unhashed chunk into a previously generated hash. In some embodiments, this accumulation is accomplished by using a CRC32 instruction with an unhashed chunk used as the data to be hashed and a previous hash value as the basis value. This accumulation results in each subsequently generated hash depending on a previously generated hash.

After performing hash operations (at 640 and 645), process 625 again determines (at 625) whether the number of unhashed chunks is greater than the number of processing units. When the number of unhashed chunks is less than the number of processing units, process 600 then determines (at 650) whether any remainder chunks remain. A remainder chunk results when at least one half a chunk remains after performing the hash operations (at 640 and 645) on sets of chunks.

Figure 7:
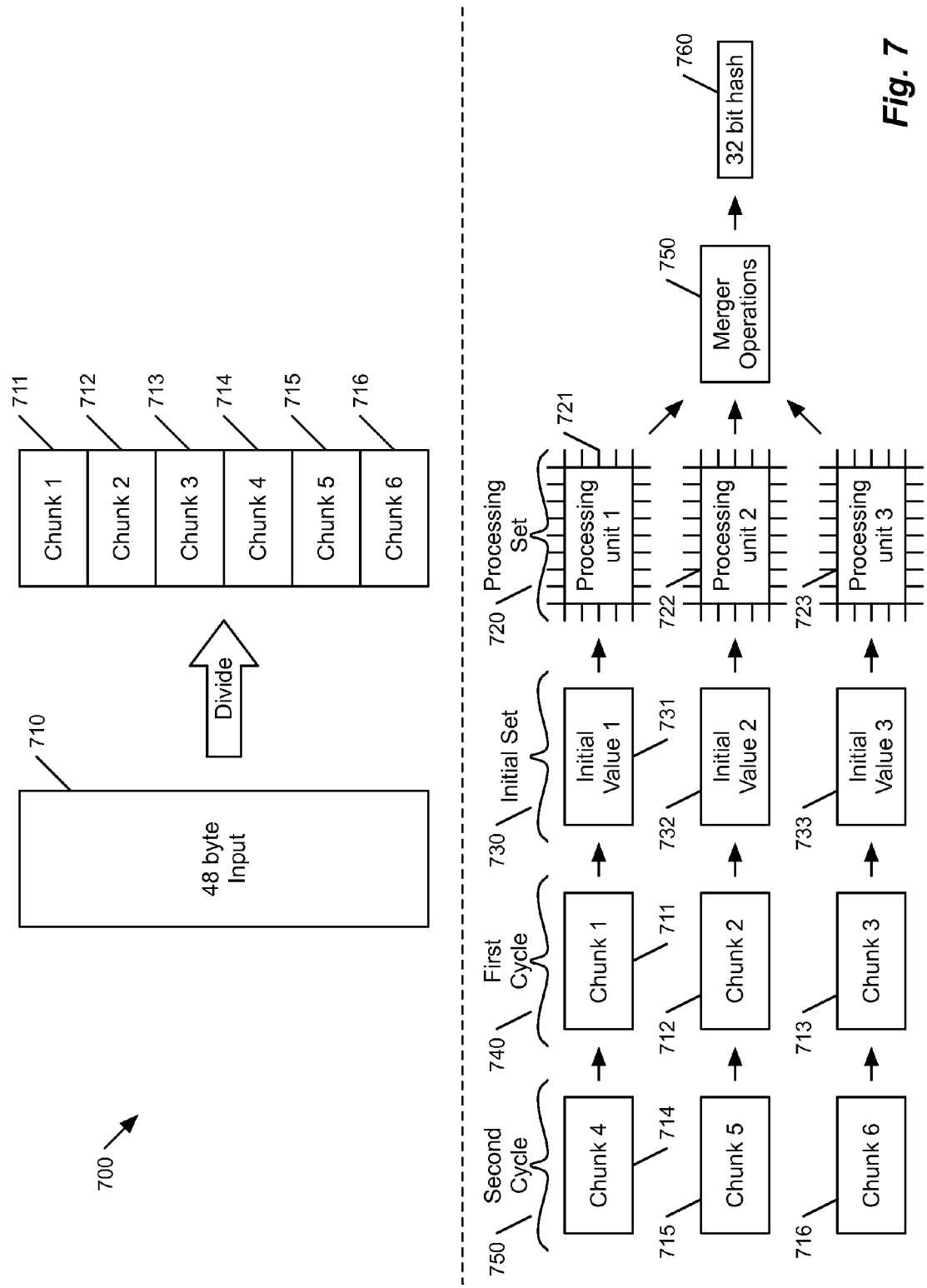
FIG. 7 conceptually illustrates an example of striping hash input chunks across multiple processing units where there are no remainder chunks.

In order to make clear how process 600 handles various remainder cases, the process 600 will be discussed in connection with examples of various remainder lengths shown in FIGS. 7-12. In the first example discussed above with 48-bytes of input, no hash chunks will remain after two cycles of hashes. FIG. 7 conceptually illustrates the above-mentioned first example of hashing a 48-byte input on three 64-bit processing units.

As shown in the top half of FIG. 7, example 700 includes a 48-byte input 710 being divided into six 8-byte chunks 711-716. The bottom half of FIG. 7 shows processing unit 1 721, processing unit 2 722, and processing unit 3 723 of processing unit set 720 receiving sets of input. Initial set 730 is a set of values produced as basis values for the first cycle of hashing operations. The initial set 730 includes: initial value 1 731, initial value 2 732, and initial value 3 733. The values of the initial set 730 will be used as basis values for hash operations associated with chunks from first cycle 740.

First cycle 740 includes chunk 1 711, chunk 2 712, and chunk 3 713. In the first cycle 740, processing unit 1 721 generates a first hash using a CRC32 operation on unhashed chunk 1 711 with initial value 1 731 as the basis value. Processing unit 2 722 generates a second hash using a CRC32 operation on unhashed chunk 2 712 with initial value 2 732 as the basis value. Processing unit 3 723 generates a third hash using a CRC32 operation on unhashed chunk 3 713 with initial value 3 733 as the basis value.

After the first cycle 740, the processing units of processing set 730 will each produce a resulting hash (e.g., the first, second, and third hash). However, chunk 4 714, chunk 5 715, and chunk 6 716 remain unhashed after first cycle 740. Accordingly, chunk 4 714, chunk 5 715, and chunk 6 716 will then be distributed across the processing unit set 730. The hashes generated from the first cycle 740 will be used as basis values for hash operations performed on chunks from the second cycle 750. In this manner, chunk 4 714, chunk 5 715, and chunk 6 716 will be accumulated into hashes from chunk 1 711, chunk 2 712, and chunk 3 713.

In the second cycle 750, processing unit 1 721 accumulates unhashed chunk 4 714 into the hash of chunk 1 711 by performing a CRC32 operation on unhashed chunk 4 714 with the hash of chunk 1 711 as the basis value. Processing unit 2 722 accumulates unhashed chunk 5 715 into the hash of chunk 2 712 by performing a CRC32 operation on unhashed chunk 5 715 with the hash of chunk 2 712 as the basis value. Processing unit 3 723 accumulates unhashed chunk 6 716 into the hash of chunk 3 713 by performing a CRC32 operation on unhashed chunk 6 716 with the hash of chunk 3 713 as the basis value.

After the second cycle 750, no chunks will remain. As a result, there are no remainder chunks resulting from the hashing of the chunks from 48-byte input 710. The resulting hashes will be passed to merger operations 760 for merger into a single 32-bit hash 770. The single 32-bit hash 770 will be processed further according to process 600 shown in FIG. 6.

Returning to process 600 of FIG. 6, when process 600 determines (at 650) that there are remainder chunks, the process 600 then proceeds to hash these remainder chunks into the hashes resulting from the previous hash operations. The process 600 hashes these remainder chunks according to a series of different cases shown at determinations 651-654. Each of these cases corresponds to a different quantity of remainder chunks. When there is at least one remainder chunk, process 600 will perform at least one of operations 661-665 based on the quantity of remainder chunks.

Figure 8:
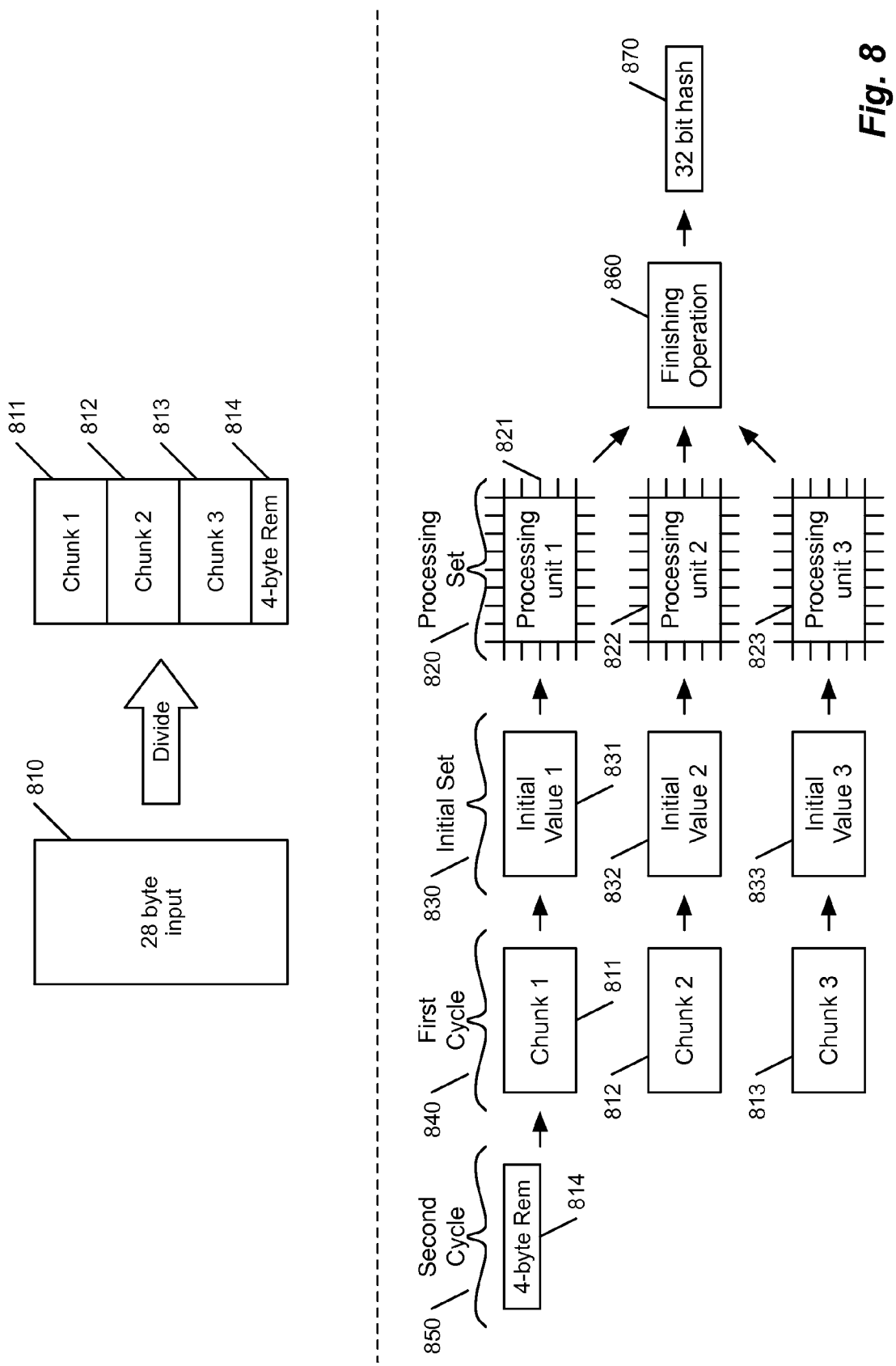
FIG. 8 conceptually illustrates an example of striping hash input chunks across multiple processing units where there is one-half of a remainder chunk.

When one half of a chunk (e.g. 4 bytes) remains, the process 600 accumulates (at 660) the one half of a chunk into a first hash on a first processing unit using a 32-bit CRC32 instruction. This scenario corresponds to example 800 shown in FIG. 8. As shown in the top half of FIG. 8, example 800 includes a 28-byte input 810 being divided into three 8-byte chunks (chunk 1 811, chunk 2 812, and chunk 3 813) and one 4-byte remainder chunk 814. In some embodiments, a "chunk" is two words (i.e. two 4-byte sections). 4-byte remainder chunk 814 is one word long. Accordingly, it is half a chunk in length. The bottom half of FIG. 8 shows processing unit 1 821, processing unit 2 822, and processing unit 3 823 of processing unit set 820 receiving sets of input. The initial set 830 includes: initial value 1 831, initial value 2 832, and initial value 3 833. The values of the initial set 830 will be used as basis values for hash operations associated with chunks from first cycle 840.

First cycle 840 includes chunk 1 811, chunk 2 812, and chunk 3 813. In the first cycle 840, processing unit 1 821 generates a first hash using a CRC32 operation on unhashed chunk 1 811 with initial value 1 831 as the basis value. Processing unit 2 822 generates a second hash using a CRC32 operation on unhashed chunk 2 812 with initial value 2 832 as the basis value. Processing unit 3 823 generates a third hash using a CRC32 operation on unhashed chunk 3 813 with initial value 3 833 as the basis value.

After the first cycle 840, the processing units of processing set 830 will each produce a resulting hash. However, remainder chunk 814 remains unhashed. Prior art methods of handling remainders in multiple processing unit hash operations would simply pad remainder chunk 814 until it was long enough to stripe across all the processing units of processing set 830 (e.g. pad remainder chunk 814 with extra bits to be 24-bytes long). These prior art methods would result in extraneous hashing operations of the padding on processing unit 822 and processing unit 823. In order to improve the efficiency of multiple processing unit hashing operations, embodiments of the invention accumulate remainder chunks onto previously generated hashes.

In the second cycle 850, processing unit 1 821 accumulating remainder chunk 814 into the previously generated hash from the first cycle 840. Specifically, processing unit 1 821 accumulates remainder chunk 814 into the hash of chunk 1 811 by performing a 32-bit CRC32 operation on remainder chunk 814 with the hash of chunk 1 811 as the basis value. During the second cycle 850, processing unit 822 and processing unit 823 will be available for other instructions. Because remainder chunk 814 is half the length of a standard chunk (e.g. 4-bytes), a different CRC32 hash instruction will have to be used than the one used in first cycle 840. For instance, if a 64-bit CRC32 instruction is used with full size (8-byte) chunks, then a 32-bit CRC32 instruction will have to be used with half size (4-byte) chunks.

After the second cycle 850, no chunks or remainder chunks will remain. The resulting hashes will be passed to merger operations 860 for merger into a single 32-bit hash 870. The single 32-bit hash 870 will be processed further according to process 600 shown in FIG. 6.

Returning to process 600 of FIG. 6, when process 600 determines (at 652) that there is a single remainder chunk, the process 600 then proceeds to accumulate (at 661) the first whole chunk on a first processing unit using a 64-bit CRC32 instruction. This scenario corresponds to example 900 shown in FIG. 9.

Figure 9:
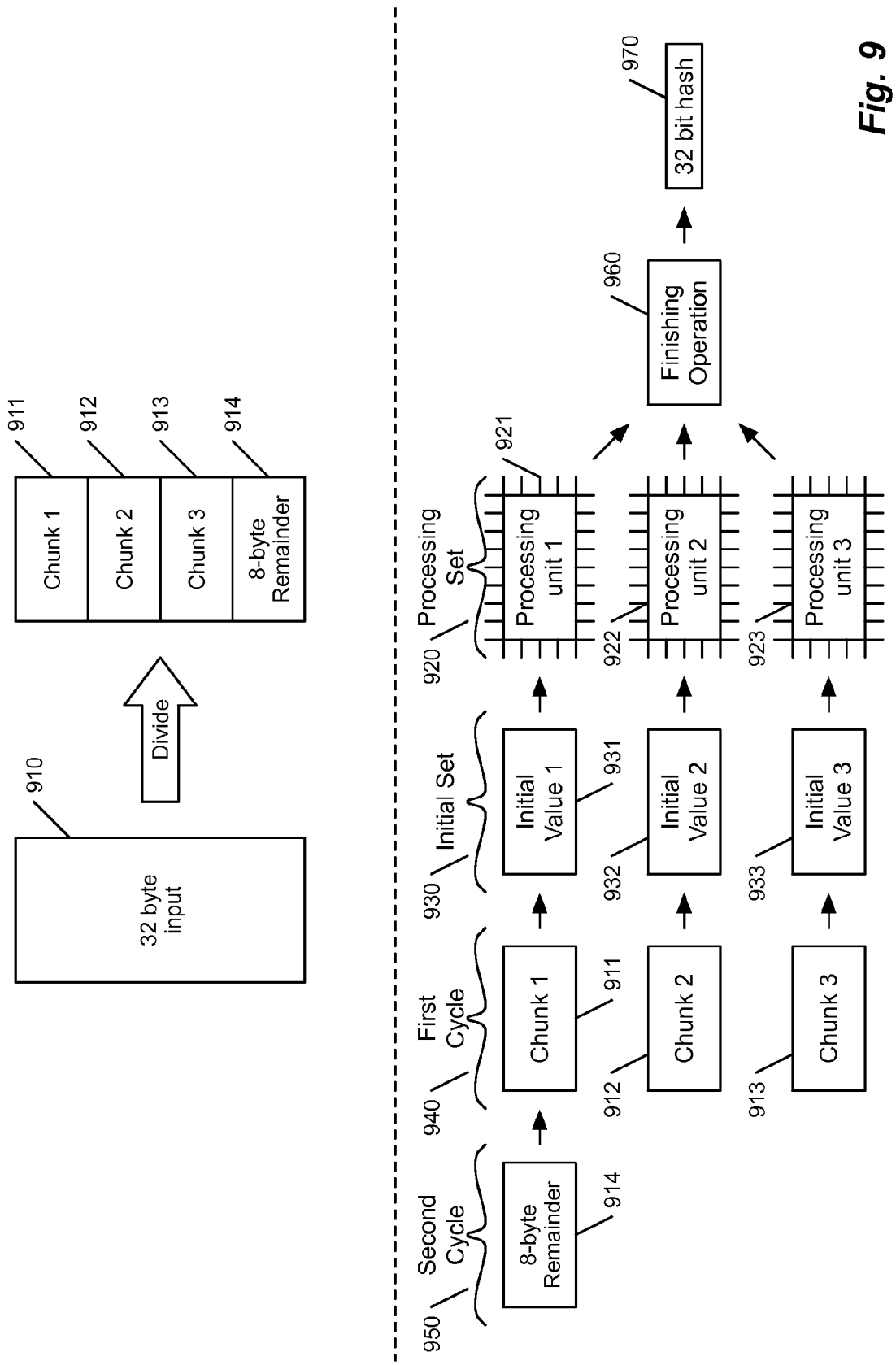
FIG. 9 conceptually illustrates an example of striping hash input chunks across multiple processing units where there is one remainder chunk.

As shown in the top half of FIG. 9, example 900 includes a 32-byte input 910 being divided into three 8-byte chunks (chunk 1 911, chunk 2 912, and chunk 3 913) and one 8-byte remainder chunk 914. The bottom half of FIG. 9 shows processing unit 1 921, processing unit 2 922, and processing unit 3 923 of processing unit set 920 receiving sets of input. The initial set 930 includes: initial value 1 931, initial value 2 932, and initial value 3 933. The values of the initial set 930 will be used as basis values for hash operations associated with chunks from first cycle 940.

First cycle 940 includes chunk 1 911, chunk 2 912, and chunk 3 913. In the first cycle 940, processing unit 1 921 generates a first hash using a CRC32 operation on unhashed chunk 1 911 with initial value 1 931 as the basis value. Processing unit 2 922 generates a second hash using a CRC32 operation on unhashed chunk 2 912 with initial value 2 932 as the basis value. Processing unit 3 923 generates a third hash using a CRC32 operation on unhashed chunk 3 913 with initial value 3 933 as the basis value.

After the first cycle 940, the processing units of processing set 930 will each produce a resulting hash. In order to avoid extraneous hashing of padding values on processing unit 922 and processing unit 923, embodiments of the invention accumulate remainder chunks onto previously generated hashes.

In the second cycle 950, processing unit 1 921 accumulating remainder chunk 914 into the previously generated hash from the first cycle 940. Specifically, processing unit 1 921 accumulates remainder chunk 914 into the hash of chunk 1 911 by performing a 64-bit CRC32 operation on remainder chunk 914 with the hash of chunk 1 911 as the basis value. During the second cycle 950, processing unit 922 and processing unit 823 will be available for other instructions.

After the second cycle 950, no chunks or remainder chunks will remain. The resulting hashes will be passed to merger operations 960 for merger into a single 32-bit hash 970. The single 32-bit hash 870 will be processed further according to process 600 shown in FIG. 6.

Returning to process 600 from FIG. 6, when process 600 determines (at 653) that there is a one and a half remainder chunks, the process 600 then proceeds to accumulate (at 662) the third one half remainder chunk on a second processing unit using a 32-bit CRC32 instruction. After the first accumulation (at 662), the process 600 then accumulates (at 661) the first whole remainder chunk on a first processing unit using a 64-bit CRC32 instruction. Each processing unit can only process one chunk at a time (at most). Accordingly, the task must be split between the first two processing units. This scenario corresponds to example 1000 shown in FIG. 10.

Figure 10:
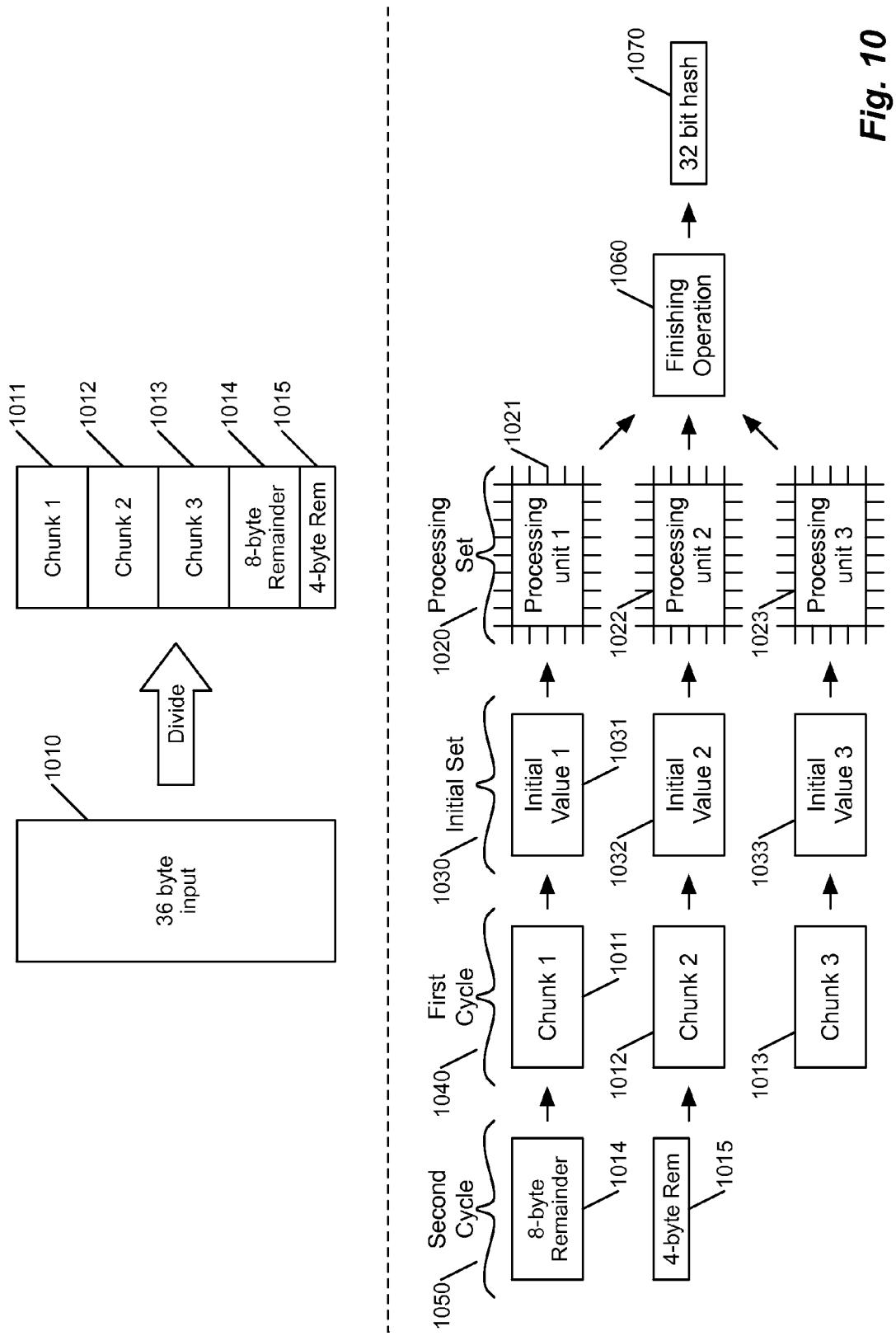
FIG. 10 conceptually illustrates an example of striping hash input chunks across multiple processing units where there are one and a half remainder chunks.

As shown in the top half of FIG. 10, example 1000 includes a 36-byte input 1010 being divided into three 8-byte chunks (chunk 1 1011, chunk 2 1012, and chunk 3 1013), one 8-byte remainder chunk 1014, and one 4-byte remainder chunk 1015. The bottom half of FIG. 10 shows processing unit 1 1021, processing unit 2 1022, and processing unit 3 1023 of processing unit set 1020 receiving sets of input. The initial set 1030 includes: initial value 1 1031, initial value 2 1032, and initial value 3 1033. The values of the initial set 1030 will be used as basis values for hash operations associated with chunks from first cycle 1040.

First cycle 1040 includes chunk 1 1011, chunk 2 1012, and chunk 3 1013. In the first cycle 1040, processing unit 1 1021 generates a first hash using a CRC32 operation on unhashed chunk 1 1011 with initial value 1 1031 as the basis value. Processing unit 2 1022 generates a second hash using a CRC32 operation on unhashed chunk 2 1012 with initial value 2 1032 as the basis value. Processing unit 3 1023 generates a third hash using a CRC32 operation on unhashed chunk 3 1013 with initial value 3 1033 as the basis value.

After the first cycle 1040, the processing units of processing set 1030 will each produce a resulting hash. However, 8-byte remainder 1014 and 4-byte remainder 1015 will remain unhashed. In order to avoid extraneous hashing of padding values on processing unit 1023, embodiments of the invention accumulate remainder chunks onto previously generated hashes.

In the second cycle 1050, processing unit 1021 accumulates 8-byte remainder 1014 and processing unit 1022 accumulates 4-byte remainder 1015 onto previously generated hashes. Processing unit 1 1021 accumulates 8-byte remainder 1014 into the hash of chunk 1 1011 by performing a 64-bit CRC32 operation on 8-byte remainder 1014 with the hash of chunk 1 1011 as the basis value. Processing unit 2 1022 accumulates 4-byte remainder 1015 into the hash of chunk 2 1012 by performing a 32-bit CRC32 operation on 4-byte remainder 1015 with the hash of chunk 2 1012 as the basis value. Because 4-byte remainder 1015 is half the length of a standard chunk (e.g. 4-bytes), a 32-bit CRC32 hash instruction will have to be used to hash 4-byte remainder 1015. Whereas a 64-bit CRC32 hash instruction will be used to hash full size 8-byte remainder 1014. During the second cycle 1050, processing unit 1023 will be available for other instructions while processing unit 1 1021 and processing unit 2 1022 perform hash operations.

After the second cycle 1050, no chunks or remainder chunks will remain. The resulting hashes will be passed to finishing operations 1060 for merger into a single 32-bit hash 1070. The single 32-bit hash 1070 will be processed further according to process 600 shown in FIG. 6.

Returning to process 600 of FIG. 6, when process 600 determines (at 654) that there are two remainder chunks, the process 600 then proceeds to accumulate (at 664) the second remainder chunk on a second processing unit using a 64-bit CRC32 instruction. After the first accumulation (at 664), the process 600 then accumulates (at 663) the first whole remainder chunk on a first processing unit using a 64-bit CRC32 instruction. Each processing unit can only process one chunk at a time (at most). Accordingly, the task must be split between the first two processing units. This scenario corresponds to example 1100 shown in FIG. 11.

As shown in the top half of FIG. 11, example 1100 includes a 40-byte input 1110 being divided into three 8-byte chunks (chunk 1 1111, chunk 2 1112, and chunk 3 1113), a first 8-byte remainder chunk 1 1114, and a second 8-byte remainder chunk 2 1115. The bottom half of FIG. 11 shows processing unit 1 1121, processing unit 2 1122, and processing unit 3 1123 of processing unit set 1120 receiving sets of input. The initial set 1130 includes: initial value 1 1131, initial value 2 1132, and initial value 3 1133. The values of the initial set 1130 will be used as basis values for hash operations associated with chunks from first cycle 1140.

First cycle 1140 includes chunk 1 1111, chunk 2 1112, and chunk 3 1113. In the first cycle 1140, processing unit 1 1121 generates a first hash using a CRC32 operation on unhashed chunk 1 1111 with initial value 1 1131 as the basis value. Processing unit 2 1122 generates a second hash using a CRC32 operation on unhashed chunk 2 1112 with initial value 2 1132 as the basis value. Processing unit 3 1123 generates a third hash using a CRC32 operation on unhashed chunk 3 1113 with initial value 3 1133 as the basis value.

After the first cycle 1140, the processing units of processing set 1130 will each produce a resulting hash. However, remainder chunk 1 1114 and remainder chunk 2 1115 will remain unhashed. In order to avoid extraneous hashing of padding values on processing unit 1123, embodiments of the invention accumulate remainder chunks onto previously generated hashes.

In the second cycle 1150, processing unit 1121 accumulates remainder chunk 1 1114 and processing unit 1122 accumulates remainder chunk 2 1115 onto previously generated hashes. Processing unit 1 1121 accumulates remainder chunk 1 1114 into the hash of chunk 1 1111 by performing a 64-bit CRC32 operation on remainder chunk 1 1114 with the hash of chunk 1 1111 as the basis value. Processing unit 2 1122 accumulates remainder chunk 2 1115 into the hash of chunk 2 1112 by performing a 64-bit CRC32 operation on 4 remainder chunk 2 1115 with the hash of chunk 2 1112 as the basis value. During the second cycle 1150, processing unit 1123 will be available for other instructions while processing unit 1 1121 and processing unit 2 1122 perform hash operations.

After the second cycle 1150, no chunks or remainder chunks will remain. The resulting hashes will be passed to finishing operations 1160 for merger into a single 32-bit hash 1170. The single 32-bit hash 1170 will be processed further according to process 600 shown in FIG. 6.

Returning to process 600 of FIG. 6, when process 600 determines (at 654) that there are not two whole remainder chunks, then it must be the case that there are two and a half remainder chunks (if there were three remainder chunks, then process 600 would simply distribute the three chunks to the three processing units). When there are two and a half remainder chunks, the process 600 accumulates (at 665) the fifth one half remainder chunk on a third processing unit using a 32-bit CRC32 instruction. After the first accumulation, the process 600 then accumulates (at 664) the second whole remainder chunk on a second processing unit using a 64-bit CRC32 instruction. After the second accumulation, the process 600 then accumulates (at 662) the first whole remainder chunk on a first processing unit using a 64-bit CRC32 instruction. Each processing unit can only process one chunk at a time (at most). Accordingly, the task must be split between the three processing units. This scenario corresponds to example 1200 shown in FIG. 12.

Figure 12:
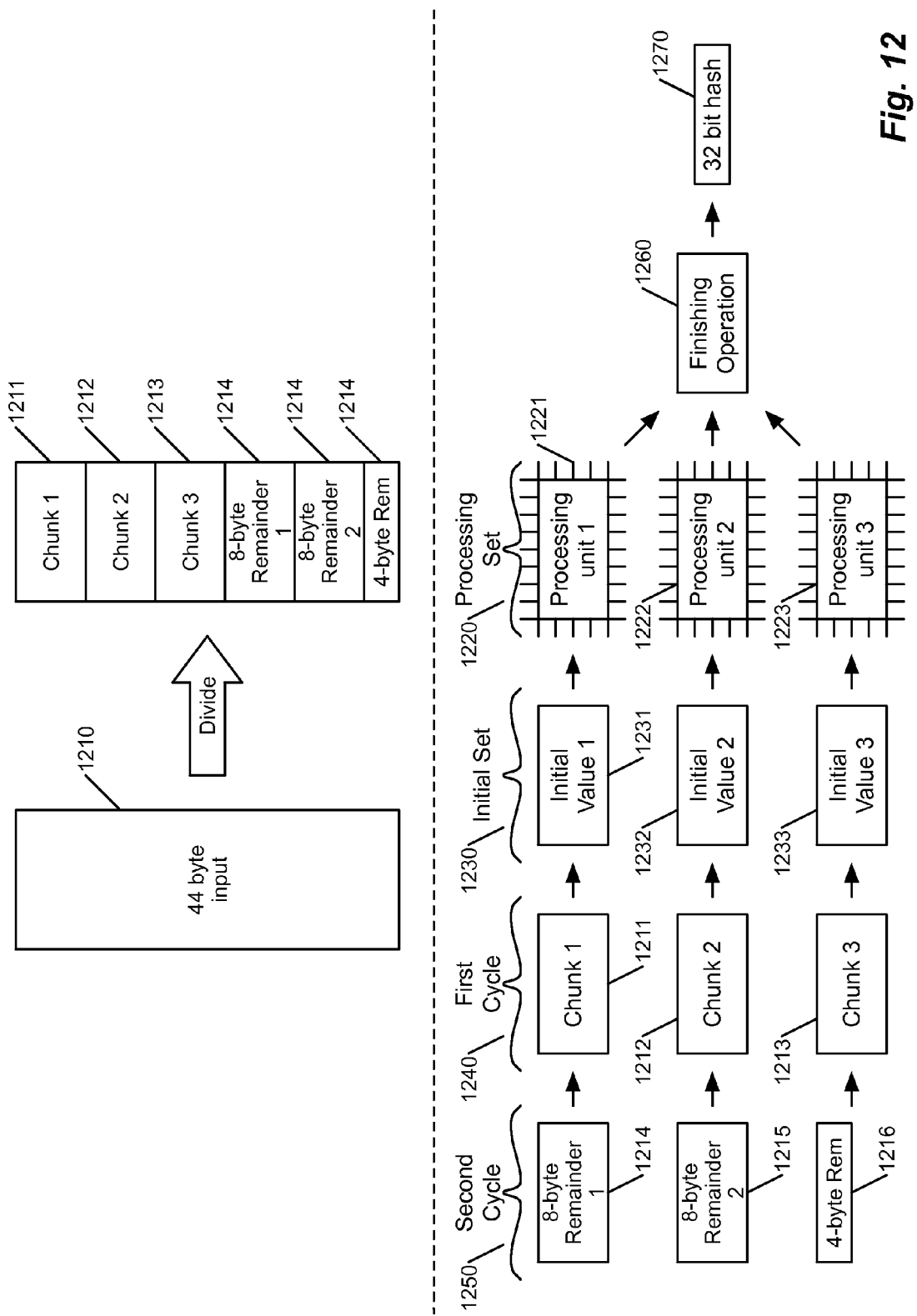
FIG. 12 conceptually illustrates an example of striping hash input chunks across multiple processing units where there are two and a half remainder chunks.

As shown in the top half of FIG. 12, example 1200 includes a 44-byte input 1210 being divided into three 8-byte chunks (chunk 1 1211, chunk 2 1212, and chunk 3 1213), a first 8-byte remainder chunk 1 1214, a second 8-byte remainder chunk 2 1215, and one 4-byte remainder chunk 1216. The bottom half of FIG. 12 shows processing unit 1 1221, processing unit 2 1222, and processing unit 3 1223 of processing unit set 1220 receiving sets of input. The initial set 1230 includes: initial value 1 1231, initial value 2 1232, and initial value 3 1233. The values of the initial set 1230 will be used as basis values for hash operations associated with chunks from first cycle 1240.

First cycle 1240 includes chunk 1 1211, chunk 2 1212, and chunk 3 1213. In the first cycle 1240, processing unit 1 1221 generates a first hash using a CRC32 operation on unhashed chunk 1 1211 with initial value 1 1231 as the basis value. Processing unit 2 1222 generates a second hash using a CRC32 operation on unhashed chunk 2 1212 with initial value 2 1232 as the basis value. Processing unit 3 1223 generates a third hash using a CRC32 operation on unhashed chunk 3 1213 with initial value 3 1233 as the basis value.

After the first cycle 1240, the processing units of processing set 1230 will each produce a resulting hash. However, remainder chunk 1 1214, remainder chunk 2 1215, and 4-byte remainder chunk 1216 will remain unhashed. In the second cycle 1250, processing unit 1221 accumulates remainder chunk 1 1214, processing unit 1222 accumulates remainder chunk 2 1215, and processing unit 1223 accumulates 4-byte remainder chunk 1216 onto previously generated hashes. Processing unit 1 1221 accumulates remainder chunk 1 1214 into the hash of chunk 1 1211 by performing a 64-bit CRC32 operation on remainder chunk 1 1214 with the hash of chunk 1 1211 as the basis value. Processing unit 2 1222 accumulates remainder chunk 2 1215 into the hash of chunk 2 1212 by performing a 64-bit CRC32 operation on 4 remainder chunk 2 1215 with the hash of chunk 2 1212 as the basis value. Processing unit 3 1223 accumulates 4-byte remainder chunk 1216 into the hash of chunk 3 1213 by performing a 32-bit CRC32 operation on 4-byte remainder chunk 1216 with the hash of chunk 3 1213 as the basis value.

Because 4-byte remainder chunk 1216 is half the length of a standard chunk (e.g. 4-bytes), a different CRC32 hash instruction will have to be used than the one used in first cycle 840. For instance, if a 64-bit CRC32 instruction is used with full size (8-byte) chunks, then a 32-bit CRC32 instruction will have to be used with half size (4-byte) chunks.

After the second cycle 1250, no chunks or remainder chunks will remain. The resulting hashes will be passed to finishing operations 1260 for merger into a single 32-bit hash 1270. The single 32-bit hash 1270 will be processed further according to process 600 shown in FIG. 6.

Returning to process 600 of FIG. 6, after all (if any) remainder chunks have been hashed, the process 600 then merges (at 670) the generated hashes into a single hash. In some embodiments, the merger is performed by applying a series of addition and binary operations to the several generated hashes. The process 600 performs (at 680) a set of finishing operations on the generated hashes to generate a final hash. The finishing operations are applied to improve the quality of the final hash. The process 600 then processes (at 690) the packet based on the final hash. The process 600 then ends.

Some embodiments perform variations on the process 100. The specific operations of the process 100 may not be performed in the exact order shown and described. The specific operations may not be performed in one continuous series of operations, and different specific operations may be performed in different embodiments.

In the examples discussed above in connection with FIGS. 7-12, the physical forwarding element had three processing units. Some embodiments include different quantities of processing units and different types of processing units. For instance, a physical forwarding element can have four ALUs performing hashing operations on a single CPU. In addition, while the above examples were discussed in terms of 64-bit chunks, some embodiments may use different size processors and different size hash operation inputs. For instance, on a machine with 32-bit processing units, chunks may be 32-bits in size with half chunk remainders being 16-bits long. In the 32-bit processing unit case, 32-bit CRC32 instructions and 16-bit CRC32 instructions will be used.

In addition, a further advantage to striping CRC32 instructions across multiple processing units is that the inherent latency of each CPU CRC32 instruction. While the instruction execution time may be one cycle, the latency of the instruction makes the results be not available until after additional cycles. Computing multiple hashes in an interleaved fashion keeps the CPU doing productive work at each cycle, as the previous result of an individual CRC32 function is only needed several cycles afterwards. Further, although many examples describes using CRC32, one of ordinary skill in the art would understand that many of the features, such as the remainder handling feature, can be applied to any different hashing techniques that performs such chunking or division operation. For instance, a portion of the header can be divided for other hardware instruction set, and each remainder chunks can be factored into one of the generated hashes.

III. Example Use Cases

Figure 13:
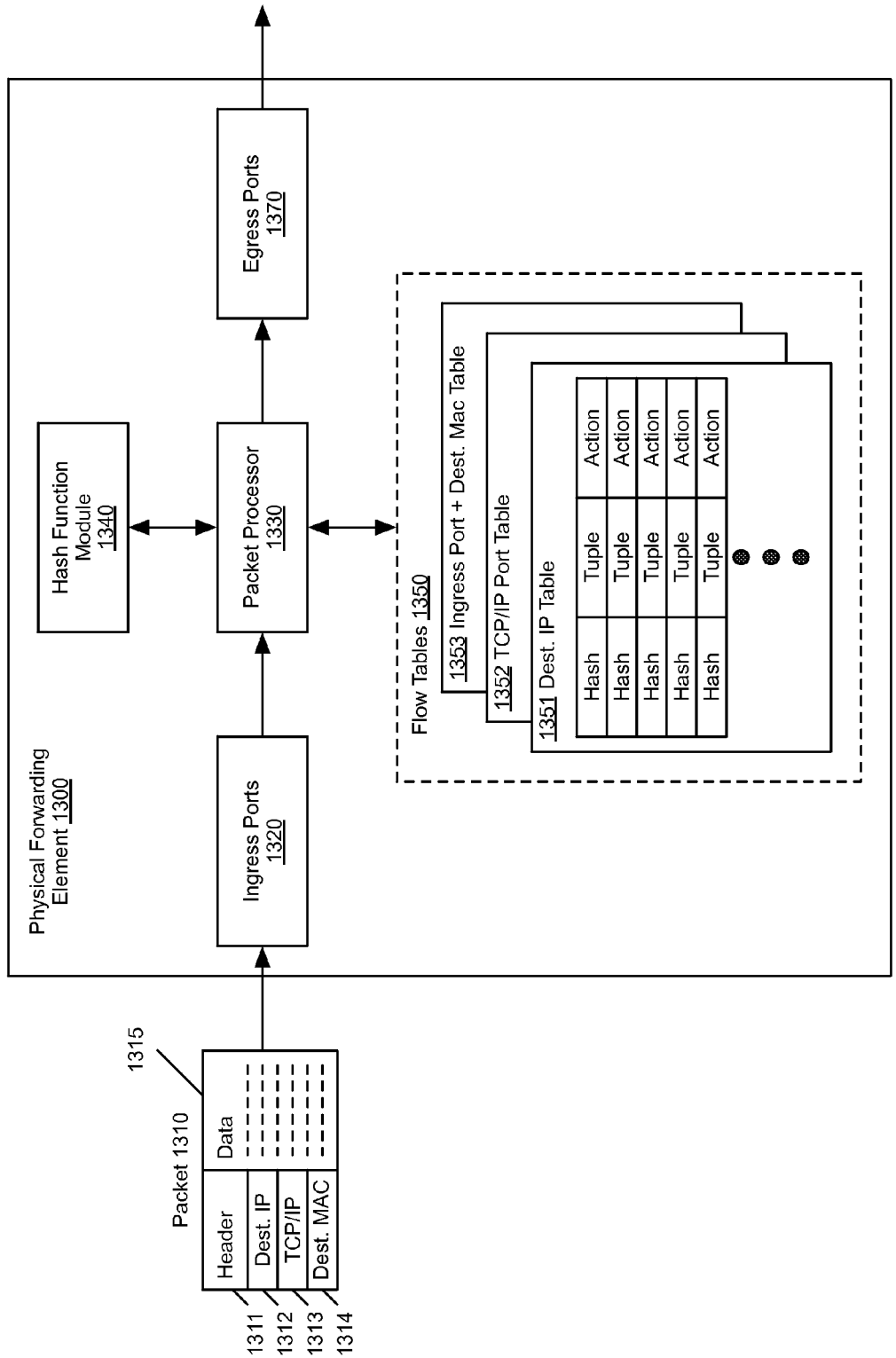
FIG. 13 illustrates an example use of hashing header fields of an incoming packet and matching the hash with hash tables.

Having discussed example hashing techniques, several example uses of these techniques will be now be described by reference to FIGS. 13 and 14. In these examples, the hashing is used to facilitate flow table lookup and perform a multipath routing strategy. One of ordinary skill in the art would understand that following examples are just two example use cases, and there can be multiple other use cases. In addition, although many of the examples described herein shows a physical forwarding element, the hashing can be performed by any component or appliance that require quality hashes for different purposes. As an example, the hashing can be performed by a network load balancer appliance that balances traffic for different server clusters. Alternatively, the hashing may be used for data partitioning in distributed storage services. The hashing may be used for firewalling, per-flow statistics in switches (e.g., QoS), etc., P2P file sharing, etc.

A. Use of Hashes in Flow Table Lookups

The physical forwarding element of some embodiments performs packet processing based on hashes generated from packet headers. Efficient generation of quality hashes is of great importance in the following example. FIG. 13 conceptually illustrates a block diagram of a physical forwarding element 1300 of some embodiments that processes packets using the above-described hash techniques. As shown, the physical forwarding element 1300 includes ingress ports 1320, a packet processor 1330, a hash function module 1340, flow tables 1350, and egress ports 1370. Also shown is an example packet 1310 being received at ingress ports 1320. Physical forwarding element 1300 will process packet 1310 by comparing hashes of several fields from header 1311 to hash entries in flow tables 1350.

Packet 1310 includes a header 1311 and data 1315. The header 1311 includes several fields that include data regarding the packet. In this example, header 1311 includes destination IP address 1312, TCP/IP port 1313, and destination MAC address 1313. In some embodiments, different packet header information may be available. Data 1315 includes the data payload to be delivered by the packet. The packet 1310 is received by the physical forwarding element 1300 at ingress ports 1320.

The ingress ports 1320 conceptually represent a set of ports through which the physical forwarding element 1300 receives network data. The ingress ports 1320 may include different amounts of ingress ports in different embodiments. As shown, the ingress ports 1320 can receive network data that is external to the physical forwarding element 1300, which is indicated as incoming example packet 1310.

The packet processor 1330 processes network data (e.g., packets) that the packet processor 1330 receives from the ingress ports 1310 based on flows in the flow tables 1350. In processing packets, packet processor 1330 will need hashes performed on tuples from header fields of packets. In order to generate these hashes, packet processor 1330 will send selected tuples from header packet fields to hash function module 1340 for hashing. In some embodiments, hash function module is a sub-component of packet process 1330. When used herein, the term "tuple" means a set of portions of a packet header. A tuple can include one section from a packet header (e.g., destination IP address). Alternatively, a tuple can include portions of several sections from a packet header (e.g., the first half of TCP/IP address and the second half of ingress port).

Hash function module 1340 performs hash operations on selected portions (or tuples) of packet headers. The hash function module 1340 uses the hashing techniques described above to efficiently generate high entropy hashes from the selected portions of packet headers. The packet processor 1330 then uses these hashes to look up matching flows in flow tables 1350.

In some embodiments, the packet processor 1330 uses a tuple search algorithm to find a matching flow in the flow tables 1350. The tuple space search algorithm is a hashed-based search algorithm. Rather than linearly traversing through every flow, the tuple space algorithm linearly traverses through different groups of rules that are organized by hash-match fields. In some cases, the tuple space search can be much faster than a "linear search" because it can perform a lookup within a group of rules that have the same wildcard pattern using a hash table. In this manner, the use of hashes greatly reduces the amount of flow comparisons needed to process packets.

The flow tables 1350 conceptually represent a set of flow tables for routing and modifying network data received from the ingress ports 1320. In some embodiments, flow tables 1350 are learning flow tables that are continuously updated over time with new flows as packets are received and processed. A flow includes a hash, a tuple, and an action. A hash may match several hash entries from several flows. The packet processor 1330 compares tuples from packets that hash-match a flow with the tuple entries in the hash-matched flow entries. When a packet's tuple values match a flow's tuple values, the physical forwarding element 1300 will perform the action associated with the matching flow. The actions can include routing or modifying packets and sending the packets to the egress ports 1370 based on the actions.

As shown, flow tables 1350 include destination IP flow table 1351, TCPIP port flow table 1362, and Ingress Port+destination MAC address flow table 1353. Each of these flow tables is associated with a particular tuple (or tuple set). The destination IP flow table 1351 is associated with the destination IP tuple. The Ingress Port+destination MAC address flow table 1353 is associated with a tuple that is derived from the ingress port and destination MAC address of packet headers. Some embodiments include additional flow tables associated with different tuples from packet headers.

B. Selecting an Equal Cost Multi-Path Leg

In some embodiments, the physical forwarding element is an edge forwarding element in a network of edge forwarding elements and non-edge edge forwarding elements. When a first edge forwarding element needs to send packets to a second edge forwarding element, a route through the non-edge forwarding elements must be chosen. However, when multiple paths through the non-edge forwarding elements are available, and they are of equal cost, the first edge forwarding element must then decide amongst several equal ways to reach the second edge forwarding element. In that case, even distribution of packets is critical. Should any of the equal cost multi-path (hereinafter ECMP) legs become overburdened then network speeds will suffer.

Figure 14:
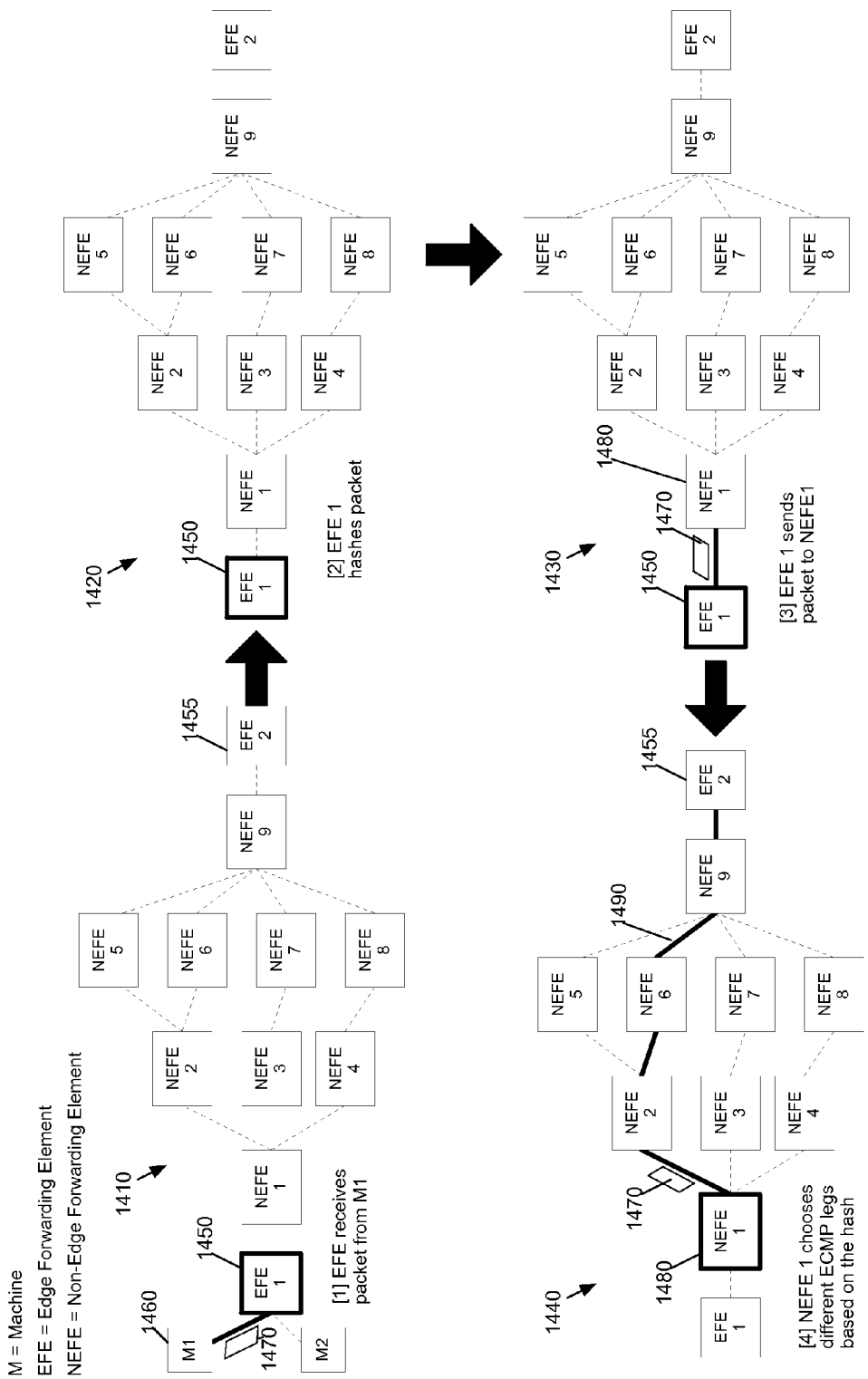
FIG. 14 conceptually illustrates an example use case of the described hashing techniques in selecting an equal-cost multi-path routing (ECMP) leg in a network.

FIG. 14 illustrates an example of how some embodiments select ECMP legs based on hashes of packet headers. Particularly, the figure shows in four operational stages 1410-1440 how the forwarding elements of a network select ECMP legs using hashes of a packet's 1470 header. As shown, the network includes edge forwarding element 1 1450 (hereinafter abbreviated "EFE"), edge forwarding element 2 1455, non-edge forwarding elements 1-9 (hereinafter abbreviated "NEFE"), and machines 1 and 2 (hereinafter abbreviated "M1" and "M2"). In this example, the EFE's and NEFE's are physical forwarding elements of some embodiments of the invention. The selection of an ECMP leg by the forwarding elements of the network will now be discussed by reference to the four operational stages 1410-1440 that are shown in FIG. 14.

The first stage 1410 illustrates EFE1 1450 receiving packet 1470 from M1 1460. Packet 1470 has a destination address on the other side of the network through EFE2 1455. In order to reach EFE2 1455, the packet 1470 must be sent through one of several ECMP legs through the non-edge forwarding elements. The second stage 1420 illustrates EFE1 1450 performing a hash on a portion of the packet 1460 header. This hash will be used to select an ECMP leg. In order to ensure that the non-edge forwarding elements receive this hash, some embodiments store the hash as the source port of packet 1460. The hash function must produce well-distributed hashes that uniformly distribute hash inputs amongst the possible hash results.

The third stage 1430 illustrates EFE1 1450 transmitting the modified packet 1470 to NEFE1 1480. The fourth stage 1440 illustrates NEFE1 1480 using the previously generated hash to select an ECMP leg through the network. Here, the NEFE 1480 performs load balancing by choosing a particular path for the packet. Other packets in the same data flow will also be forwarded along the same path because those packets have the same set of header values. However, as various packets associated with different data flows are received and different hashes are computed, different ECMP legs will be chosen using the different hashes. In this manner, hash quality ensures and even selection of ECMP legs.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 15:
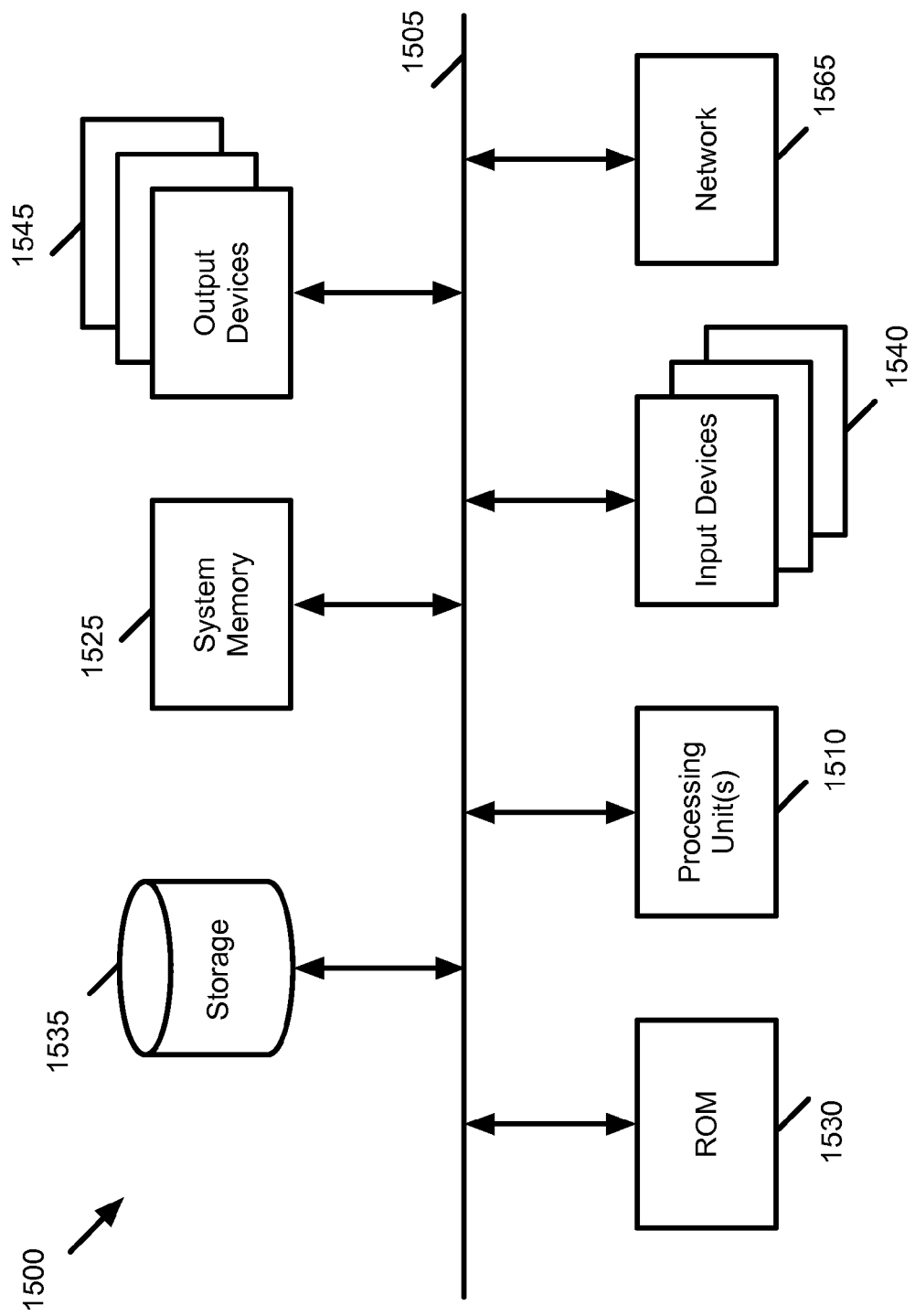
FIG. 15 conceptually illustrates an electronic system with which some embodiments of the invention are implemented.

FIG. 15 conceptually illustrates an electronic system 1500 with which some embodiments of the invention are implemented. The electronic system 1500 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1500 includes a bus 1505, processing unit(s) 1510, a system memory 1525, a read-only memory 1530, a permanent storage device 1535, input devices 1540, and output devices 1545.

The bus 1505 collectively represents all system, peripheral, and chipset buses that communicatively connect the numerous internal devices of the electronic system 1500. For instance, the bus 1505 communicatively connects the processing unit(s) 1510 with the read-only memory 1530, the system memory 1525, and the permanent storage device 1535.

From these various memory units, the processing unit(s) 1510 retrieves instructions to execute and data to process in order to execute the processes of the invention. The processing unit(s) may be a single processor or a multi-core processor in different embodiments.

The read-only-memory (ROM) 1530 stores static data and instructions that are needed by the processing unit(s) 1510 and other modules of the electronic system. The permanent storage device 1535, on the other hand, is a read-and-write memory device. This device is a non-volatile memory unit that stores instructions and data even when the electronic system 1500 is off. Some embodiments of the invention use a mass-storage device (such as a magnetic or optical disk and its corresponding disk drive) as the permanent storage device 1535.

Other embodiments use a removable storage device (such as a floppy disk, flash memory device, etc., and its corresponding drive) as the permanent storage device. Like the permanent storage device 1535, the system memory 1525 is a read-and-write memory device. However, unlike storage device 1535, the system memory 1525 is a volatile read-and-write memory, such a random access memory. The system memory 1525 stores some of the instructions and data that the processor needs at runtime. In some embodiments, the invention's processes are stored in the system memory 1525, the permanent storage device 1535, and/or the read-only memory 1530. From these various memory units, the processing unit(s) 1510 retrieves instructions to execute and data to process in order to execute the processes of some embodiments.

The bus 1505 also connects to the input and output devices 1540 and 1545. The input devices 1540 enable the user to communicate information and select commands to the electronic system. The input devices 1540 include alphanumeric keyboards and pointing devices (also called "cursor control devices"), cameras (e.g., webcams), microphones or similar devices for receiving voice commands, etc. The output devices 1545 display images generated by the electronic system or otherwise output data. The output devices 1545 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 15, bus 1505 also couples electronic system 1500 to a network 1565 through a network adapter (not shown). In this manner, the computer can be a part of a network of computers (such as a local area network ("LAN"), a wide area network ("WAN"), or an Intranet, or a network of networks, such as the Internet. Any or all components of electronic system 1500 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "arithmetic logic unit", "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 1, 2, 5, and 6) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

What is claimed is:

1. A non-transitory machine readable medium storing a program that, when executed by at least one processing unit, generates a hash to process a packet, the program comprising sets of instructions for:
    dividing at least a portion of a packet's header into a plurality of chunks, including a set of chunks that are of equal size;
    hashing the set of chunks to generate a set of hashes;
    for each remaining chunk, hashing the remaining chunk into one of the generated hashes in the set of hashes;
    merging the set of hashes with one another to produce a final hash for the portion of the header; and
    processing the packet based on the final hash.

2. The non-transitory machine readable medium of claim 1, wherein the set of instructions for hashing each remaining chunk into one of the generated hashes comprises a set of instructions for hashing a first remaining chunk into a first hash generated from a first chunk in the set of chunks.

3. The non-transitory machine readable medium of claim 2, wherein the set of instructions for hashing each remaining chunk into one of the generated hashes further comprises a set of instructions for hashing a second remaining chunk into a second hash generated from a second chunk in the set of chunks.

4. The non-transitory machine readable medium of claim 3, wherein the set of instructions for hashing each remaining chunk into one of the generated hashes further comprises a set of instructions for hashing a third remaining chunk into a third hash generated from a third chunk in the set of chunks.

5. The non-transitory machine readable medium of claim 1, wherein the set of instructions for hashing the set of chunks comprises a hardware hash instruction that is performed by the at least one processing unit.

6. The non-transitory machine readable medium of claim 5, wherein the hardware hash instruction is based on a cyclic redundancy check (CRC) instruction.

7. The non-transitory machine readable medium of claim 6, wherein the at least one processing unit is one of a central processing unit (CPU), an arithmetic logic unit (ALU), a network processing unit (NPU), an application-specific integrated circuit (ASIC), and a CPU core.

8. The non-transitory machine readable medium of claim 1, wherein the set of instructions for hashing the set of chunks comprises sets of instructions for:
   distributing the set of chunks across a set of processing units; and
   hashing the distributed chunks in parallel using the set of processing units.

9. The non-transitory machine readable medium of claim 1, wherein the set of instructions for hashing each remaining chunk into one of the generated hashes comprises a set of instructions for hashing a first remaining chunk with a first generated hash as a basis value.

10. The non-transitory machine readable medium of claim 1, wherein the set of instructions for hashing each remaining chunk into one of the generated hashes comprises a set of instructions for hashing a first generated hash with a first remaining chunk as a basis value.

11. The non-transitory machine readable medium of claim 1, wherein a particular remaining chunk is of a size equal to one half the size of a particular chunk from the set of chunks.

12. For a forwarding element, a method of generating a hash to process a packet, the method comprising:
   dividing at least a portion of a packet's header into a plurality of chunks, including a set of chunks that are of equal size;
   hashing the set of chunks to generate a set of hashes;
   for each remaining chunk, hashing the remaining chunk into one of the generated hashes in the set of hashes;
   merging the set of hashes with one another to produce a final hash for the portion of the header; and
   processing the packet based on the final hash.

13. The method medium of claim 12, wherein hashing each remaining chunk into one of the generated hashes comprises hashing a first remaining chunk into a first hash generated from a first chunk in the set of chunks.

14. The method medium of claim 13, wherein hashing each remaining chunk into one of the generated hashes further comprises hashing a second remaining chunk into a second hash generated from a second chunk in the set of chunks.

15. The method medium of claim 12, wherein hashing the set of chunks comprises performing a hardware hash instruction.

16. The method medium of claim 15, wherein the hardware hash instruction is based on a cyclic redundancy check (CRC) instruction.

17. The method medium of claim 15, wherein the forwarding element includes at least one processing unit, wherein the at least one processing unit is one of a central processing unit (CPU), an arithmetic logic unit (ALU), an network processing unit (NPU), an application-specific integrated circuit (ASIC), and a CPU core.

18. The method medium of claim 12, wherein hashing the set of chunks comprises:
   distributing the set of chunks across a set of processing units; and
   hashing the distributed chunks in parallel using the set of processing units.

19. The method medium of claim 12, wherein hashing each remaining chunk into one of the generated hashes comprises hashing a first remaining chunk with a first generated hash as a basis value.

20. The method medium of claim 12, wherein hashing each remaining chunk into one of the generated hashes comprises hashing a first generated hash with a first remaining chunk as a basis value.

* * * * *